United States Patent [19]
Lemmons et al.

[11] Patent Number: 5,880,768
[45] Date of Patent: Mar. 9, 1999

[54] INTERACTIVE PROGRAM GUIDE SYSTEMS AND PROCESSES

[75] Inventors: Thomas R. Lemmons, Coweta; Donald W. Allison; Jerry D. Henshaw, both of Tulsa; Connie T. Marshall, Muskogee, all of Okla.

[73] Assignee: Prevue Networks, Inc., Tulsa, Okla.

[21] Appl. No.: 419,077

[22] Filed: Apr. 6, 1995

[51] Int. Cl.[6] ............................................. H04N 7/16
[52] U.S. Cl. .............................. 348/1; 348/10; 348/906; 455/6.2
[58] Field of Search .................................. 348/1, 5, 6, 7, 348/12, 13, 10, 11, 553, 552, 563, 565, 906, 461, 460, 468, 473, 478, 554, 731, 564; 455/2, 4.2, 5.1, 6.1, 6.2, 6.3; 358/84, 86; H04N 7/16, 7/173

[56] References Cited

U.S. PATENT DOCUMENTS

| | | | |
|---|---|---|---|
| 4,031,548 | 6/1977 | Kato et al. | 358/188 |
| 4,081,753 | 3/1978 | Miller | 325/396 |

(List continued on next page.)

FOREIGN PATENT DOCUMENTS

| | | |
|---|---|---|
| 23 38 380 | 2/1975 | Germany . |
| 33 37 204 | 4/1985 | Germany . |
| 59-141878 | 8/1984 | Japan . |
| 60-61935 | 4/1985 | Japan . |
| 1 554 411 | 10/1979 | United Kingdom . |
| 2 034 995 | 6/1980 | United Kingdom . |
| 2 126 002 | 3/1984 | United Kingdom . |
| 2 232 031 | 11/1990 | United Kingdom . |
| 2 264 409 | 8/1993 | United Kingdom . |
| WO 86/01359 | 2/1986 | WIPO . |
| WO 90/07844 | 7/1990 | WIPO . |
| WO 91/05436 | 4/1991 | WIPO . |
| 9413107 | 6/1994 | WIPO ............................. H04N 7/16 |
| 9501056 | 1/1995 | WIPO ............................. H04N 7/16 |
| WO 96/13935 | 5/1995 | WIPO . |
| WO 95/32583 | 11/1995 | WIPO . |
| WO 95/32585 | 11/1995 | WIPO . |
| WO 96/09721 | 3/1996 | WIPO . |
| WO 96/17473 | 6/1996 | WIPO . |

OTHER PUBLICATIONS

A. James, "ORACLE –Broadcasting the Written Word," Wireless World, Jul. 1973, pp. 314–316.

G. A. McKenzie, "ORACLE—An Information Broadcasting Service Using Data Transmission in the Vertical Interval," Journal of the SMPTE, Jan. 1974, pp. 6–10.

S. M. Edwardson and A. Gee, "CEEFAX: A Proposed New Broadcasting Service," Journal of the SMPTE, Jan. 1974, pp. 14–19.

E. Bryan Carne, "The Wired Household," IEEE Spectrum, Oct. 1979, pp. 61–66.

"Addressable Converters: A New Development at Cable Data," Via Cable, Dec. 1981. pp. 1–11.

Hofmann, Neumann, Oberlies, and Schadwinkel, "Videotext Programmiert Videorecorder," Rundfunktechnische Mitteilungen, Nov.–Dec. 1982, pp. 254–257.

(List continued on next page.)

*Primary Examiner*—Chris Grant
*Attorney, Agent, or Firm*—Fish & Neave; Joseph M. Guiliano; Matthew T. Byrne

[57] ABSTRACT

Interactive program guide systems and related processes are provided which can automatically tune a television, or program a VCR, based on program selections made from program schedule information displayed on a television or other suitable video monitor. The interactive program guide is preferably implemented using a microprocessor-controlled set-top box that is coupled to the viewer's television set. The set-top box receives program schedule information and software from a headend telecasting center. Preferably, program schedule information for the current day and at least six subsequent days is stored in a memory within the set-top box. The interactive program guide provides a display mode for allowing the viewer to apply a restrictive search selection criterion and a nonrestrictive sort attribute to the program schedule information.

91 Claims, 30 Drawing Sheets

U.S. PATENT DOCUMENTS

| | | | |
|---|---|---|---|
| 4,170,782 | 10/1979 | Miller | 358/84 |
| 4,203,130 | 5/1980 | Doumit et al. | 358/1 |
| 4,305,101 | 12/1981 | Yarbrough et al. | 360/69 |
| 4,329,684 | 5/1982 | Monteath et al. | 340/707 |
| 4,375,651 | 3/1983 | Templin et al. | 358/191.1 |
| 4,381,522 | 4/1983 | Lambert | 358/86 |
| 4,390,901 | 6/1983 | Keiser | 358/147 |
| 4,394,691 | 7/1983 | Amano et al. | 358/194.1 |
| 4,425,579 | 1/1984 | Merrell | 358/86 |
| 4,429,385 | 1/1984 | Cichelli et al. | 370/92 |
| 4,488,179 | 12/1984 | Krüger et al. | 358/181 |
| 4,495,654 | 1/1985 | Deiss | 455/151 |
| 4,527,194 | 7/1985 | Sirazi | 358/86 |
| 4,598,288 | 7/1986 | Yarbrough et al. | 340/825.34 |
| 4,635,121 | 1/1987 | Hoffman et al. | 358/188 |
| 4,641,205 | 2/1987 | Beyers, Jr. | 360/33.1 |
| 4,689,022 | 8/1987 | Peers et al. | 434/307 |
| 4,691,351 | 9/1987 | Hayashi et al. | 380/10 |
| 4,706,121 | 11/1987 | Young | 358/142 |
| 4,712,015 | 12/1987 | Köhler | 340/825.69 |
| 4,737,993 | 4/1988 | DeVilbiss | 455/180 |
| 4,751,578 | 6/1988 | Reiter et al. | 358/183 |
| 4,754,326 | 6/1988 | Kram et al. | 364/900 |
| 4,787,063 | 11/1988 | Muguet | 364/900 |
| 4,802,114 | 1/1989 | Sogame | 364/900 |
| 4,807,052 | 2/1989 | Amano | 358/194.1 |
| 4,841,368 | 6/1989 | Rumbolt et al. | 358/194.1 |
| 4,908,713 | 3/1990 | Levine | 358/335 |
| 4,963,994 | 10/1990 | Levine | 358/335 |
| 4,977,455 | 12/1990 | Young | 358/142 |
| 5,027,400 | 6/1991 | Baji et al. | 380/20 |
| 5,038,211 | 8/1991 | Hallenbeck | 358/142 |
| 5,047,867 | 9/1991 | Strubbe et al. | 358/335 |
| 5,099,319 | 3/1992 | Esch et al. | 358/86 |
| 5,123,046 | 6/1992 | Levine | 380/10 |
| 5,151,789 | 9/1992 | Young | 358/194.1 |
| 5,172,413 | 12/1992 | Bradley | 380/20 |
| 5,210,611 | 5/1993 | Yee et al. | 358/191.1 |
| 5,223,924 | 6/1993 | Strubbe | 348/7 |
| 5,253,066 | 10/1993 | Vogel | 358/188 |
| 5,283,639 | 2/1994 | Esch et al. | 348/6 |
| 5,323,240 | 6/1994 | Amano et al. | 348/731 |
| 5,353,121 | 10/1994 | Young et al. | 348/563 |
| 5,404,393 | 4/1995 | Remillard | 379/96 |
| 5,410,344 | 4/1995 | Graves et al. | 348/1 |
| 5,412,720 | 5/1995 | Hoarty | 380/15 |
| 5,416,508 | 5/1995 | Sakuma et al. | 348/7 |
| 5,444,499 | 8/1995 | Saitoh | 348/734 |
| 5,465,113 | 11/1995 | Gilboy | 348/10 |
| 5,465,385 | 11/1995 | Ohga et al. | 455/6.1 |
| 5,479,268 | 12/1995 | Young et al. | 358/335 |
| 5,481,296 | 1/1996 | Cragun et al. | 348/13 |
| 5,589,892 | 12/1996 | Knee et al. | 348/731 |
| 5,781,246 | 7/1998 | Alten et al. | 348/569 |

OTHER PUBLICATIONS

H. Eckhard Krüger, "Das Digitale Fernsehkennungssystem ZPS," Nachrichtentechnische Zeitschrift, Jun. 1982, pp. 368–376.

Arthur Heller, "VPS a New System for Domestic VCR Start/Stop By Programme Labels Transmitted Within the Insertion Data Line," Symposium Record, Broadcast Sessions, 14th International TV Symposium, Montreux, Switzerland, Jun. 6–12, 1985, pp. 345–351.

Arthur Heller, "VPS—Ein Neues System Zur Beitragsgesteuerten Programmaufzeichnung," Rundfunktechnische Mitteilungen, Jul.–Aug. 185, pp. 161–169.

W. Sommerhäuser, "Flexibel Programmieren Mit VPS," Funkschau 25, 1985, pp. 47–51.

Micheal E. Long, "The VCR Interface," 1986 NCTA Technical Papers, pp. 197–202.

Richard G. Merrell, "Tac–Timer," 1986 NCTA Technical Papers, pp. 203–206.

Vito Brugliera, "Digital On–Screen Display: A New Technology for the Consumer Interface," Symposium Record, Cable Sessions, 18th International Television Symposium and Technical Exhibition, Montreux, Switzerland, Jun. 10–15, 1993, pp. 571–586.

"A New Approach To Addressability," Cable Data product brochure, undated.

FIG.3

| Feb 09 106 | 7:00 PM 104 | 7:30 PM 104 | 8:00 PM 104 |
|---|---|---|---|
| 14 HBO 110 | (**½) ROBIN HOOD: 114 MEN IN TIGHTS (199 | | POINT OF 114 IMPACT (1 |
| 15 MAX 110 | FLY BY NIGHT (1993 Drama) (R) 114 (CC) 114 | | |
| 16 ENCORE 110 | FLY BY NIGHT 114 (1993 Drama) (R) (CC) (526 | | FLY BY 114 NIGHT (19 |
| 18 SHOW 110 | (**)ANGIE (1994 Drama) (R) 114 | | 114 |
| 21 REQ 110 | (**) LASSIE (Adv) (PG) 114 | | BLOWN 114 AWAY (Sus |

Prime Time 120 | What's On 118 | Program Search 122

△ SELECT ▽ 126 1:27:55 124

FIG.4

| Feb 09 | 7:00 PM | 7:30 PM | 8:00 PM |
|---|---|---|---|
| 14 HBO | (**½) ROBIN HOOD: MEN IN TIGHTS (199 | | POINT OF IMPACT (1 |
| 15 MAX | FLY BY NIGHT (1993 Drama) (CC) | | FLY BY NIGHT (19 |
| 16 ENCORE | ≪ FLY BY NIGHT (1993 Drama) (R) (CC) (526 | | |
| 18 SHOW | (**)ANGIE (1994 Drama) (R) | | ≫ |
| 21 REQ | ≪ LASSIE (Adv) (PG) | | BLOWN AWAY (Sus |
| 22 STARZ | MAC (Drama) (R) (CC) | | |

MENU  1:27:55

*FIG. 5*

| Feb 09 | 7:00 PM | 7:30 PM | 8:00PM |
|---|---|---|---|
| 2 KJRH | Mad About You | Friends | Seinfeld |
| 3 fX | Under Scrutiny | Home and Away (CC) | Dynasty (CC) |
| 4 DISNEY | NO DESSER (C | Charlie Brown and | Trisha Yearwood |
| 5 KOKI | Martin | Living Single | New York Undercover |
| 6 KOTV | Due South | | Eye to Eye |
| 7 KWHB | 700 Club (CC) | | Victory (CC) |

MENU    1:27:55

FIG. 6

| Feb 09 _106_ | 1:00 PM _104_ | 1:30 PM _104_ | 2:00 PM _104_ |
|---|---|---|---|
| 2 _110_ KJRH | Another World | | Sally (CC) |
| 3 _110_ fX | Family Affair (CC) | Pet Department | Greatest American H |
| 4 _110_ DISNEY | ◁◁(***) FROM DISN | New Adventures | Adventures of the Gum |
| 5 _110_ KOKI | Jenny Jones (CC) | | Donahue |
| 6 _110_ KOTV | As the World Turns | | Guiding Light |
| 7 _110_ KWHB | Lester Sumrall (CC) | Accent on Health (CC) | Boogie's Diner (CC) |
| | MENU | | 1:27:55 |

FIG. 7

| Search | | | | |
|---|---|---|---|---|
| | 210 Drama | 208 Action | 212 Sci-Fi | |

202

206 / 222 73 Programs Found

| | 224 | | | |
|---|---|---|---|---|
| | 220 HBO | | | |
| R | TRUE LIES Wed. Mar. 08 4:30PM | | | |
| | 220 MAX | | | |
| | HURRICANE SMITH Fri. Mar. 10 3:15 AM | | | |
| | 220 REQ | | | |
| | SPEED Fri. Mar. 10 7:00 PM | | | |
| | 224 | | | |
| PG | RAIDERS OF THE LOST ARK Fri. Mar.10 4:00PM | | | |
| | 220 SHO | | | |
| | LAST ACTION HERO Sat. Mar. 11 7:00 PM | | | |
| | TMC | | | |

204

| Sort | | | | |
|---|---|---|---|---|
| | 216 Alpha | 214 Rating | 218 Time | |

| MENU | 126 | 1:27:55 |
|---|---|---|

| Feb 09 | 1:00 PM | 1:30 PM | 2:00 PM |
|---|---|---|---|
| 2 KJRH | Another World | | Sally (CC) |
| 3 fX | Family Affair (CC) | Pet Department | Greatest American H |
| 4 DISNEY | ◁◁(***) FROM DISN | New Adventures | Adventures of the Gum |
| 5 KOKI | Jenny Jones (CC) | | Donahue |
| 6 KOTV | As the World Turns | | Guiding Light |
| 7 KWHB | Lester Sumrall (CC) | Accent on Health (CC) | What's on |
| | MENU | | Hot Picks  1:27:55 |

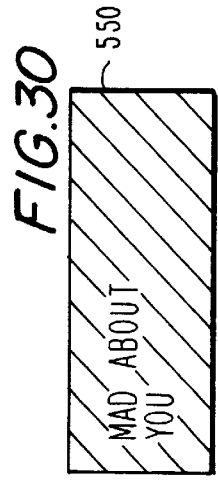

INTERACTIVE PROGRAM GUIDE SYSTEMS AND PROCESSES

BACKGROUND OF THE INVENTION

This invention relates to television program guide systems and particularly to interactive television program guide systems and related processes that can automatically tune a television, or program a video cassette recorder (VCR), based on program selections made from program schedule information displayed on a television or other suitable video monitor. More particularly, this invention relates to interactive television program guide systems and related processes that provide an intuitive search utility for allowing a viewer to locate programs of interest by applying a restrictive search selection criterion and a nonrestrictive sort attribute to program schedule information.

In response to viewer demand, cable and satellite telecasting services have been improving programming variety, mainly by increasing the number of program channels available to their customers. For example, many cable telecasting services now offer several dozen program channels, and it is expected that this number will steadily increase as more cable services replace their coaxial cable networks with fiber optic networks. It is expected that satellite telecasting services also will continue to improve programming variety by increasing the number of program channels available to their customers.

Needless to say, improved programming variety is welcomed by the viewing public, but it does not come without cost. One problem frequently encountered by viewers is that the increased number of channels has made it difficult to quickly locate and tune to programs of interest. Before cable television became popular, it was common practice for viewers to briefly sample the program being broadcast on each of the few aerial broadcast channels that were available in order to select a program to watch. However, this technique, known as "channel surfing," is difficult to do when one has to consider programs on several dozen channels, and it is possible that in doing so, a viewer will miss an undesirably large segment of the program ultimately selected for viewing.

Another concern is that the increased number of channels makes it more likely that two programs of interest will be telecast at any given time. Viewers therefore often find it necessary to record one program for later viewing while another program of interest is being watched. Thus, as the number of channels provided by telecasting services increases, the need for a system and process that simplifies the notoriously difficult task of scheduling programs for VCR recording becomes more pressing.

Over the past several years, television viewers have grown accustomed to a scrolling television program guide that is offered by many telecasting services in the United States. One such guide, known as the Prevue Channel, presents to the viewer (on a channel selected by the telecasting service), a scrolling grid containing program schedule information for each channel offered by that telecasting service. The horizontal axis of the scrolling grid identifies program schedule times, and the vertical axis identifies program channels. Typically, one and a half hours of program schedule information are provided, starting at a current time period (typically one half hour).

The grid format used by the Prevue Channel for presenting program schedule information has been favorably received by the viewing public. Essentially, the body of the grid contains an array of cells, each cell representing a program being telecast or to be telecast on the channel identified on the vertical axis, during the time periods specified on the horizontal axis. The size of each cell (i.e., the cell width) represents the length of the program (spanning one or more time periods).

Although the scrolling grid program guide has proven valuable to viewers over the past several years, it is not an interactive program guide, and therefore, it lacks certain capabilities that viewers would find very useful. For example, the scrolling grid does not have the ability to present program schedule information for telecast times beyond a relatively short period from the current time (e.g., one and a half hours). Also, the grid scrolls at a pace that the viewer cannot control. Thus, it may take several minutes for the scrolling grid to advance to program schedule information that the viewer wishes to consider. Finally, the viewer cannot directly use the scrolling grid for tuning a television to a desired channel or programming a VCR.

Attempts have been made to provide interactive program guides with such capabilities. One system is described in U.S. Pat. No. 4,706,121; however, for several reasons, the system described therein has disadvantages. For instance, the system described in U.S. Pat. No. 4,706,121 allows a viewer to choose a plurality of user program selection criteria which are combined to present a list of programs meeting the combined criteria. This operates to restrict the display of program schedule information only to those programs that meet the combined user program selection criteria. When the selection criteria are activated, the viewer is unable to select for viewing or recording any program that does not meet the selection criteria because such programs would not be listed. In order to select such a program, the viewer must either deactivate the selection criteria, or try a different combination of criteria (or perhaps a single criterion) in order to capture a program of interest within the program list.

Moreover, the approach taken in U.S. Pat. No. 4,706,121 of combining user program selection criteria may often lead to an undesirably restricted program listing. In fact, it is possible that no programs at all will be displayed in a list because none meets the overly restrictive combination of user program selection criteria. If the viewer then turns the selection criteria selection off, the entire schedule is made available to the viewer, but in an order defined by the telecasting service (e.g., typically by telecast time and channel). The viewer is not provided with the ability to sort, without restricting, either the full program listing or a restricted program listing in a meaningful way.

Thus, it would be desirable to provide interactive program guide systems and related processes that allow a viewer to apply a nonrestrictive sort attribute to program schedule information in addition to, or as an alternative to, a restrictive selection criterion.

It would also be desirable to provide interactive program guide systems and related processes in which the telecasting service can define sets of nonrestrictive sort attributes and restrictive selection criteria that the viewer can apply to the program schedule information.

It would further be desirable to provide interactive program guide systems and related processes in which the telecasting service can define different sets of nonrestrictive sort attributes for the viewer to choose from depending upon a restrictive selection criterion applied to the program schedule information by the viewer.

It is important that interactive program guides be capable of presenting several days worth of program schedule information so that the viewer can schedule VCR recording of selected programs well in advance of their telecast times. However, existing interactive program guides do not provide a convenient interface that allows the viewer to quickly select program schedule information for a particular date.

Thus, it would be desirable to provide interactive program guide systems and related processes that provide a graphical user interface for displaying the dates for which program schedule information is available, and for allowing the user to select program schedule information for a particular date.

In order to provide viewers with a full-featured interactive program guide, it is typically necessary to use several different screens, each screen being associated with one or more features of the system. However, it has been determined that viewers often find themselves lost in such systems, without a clear understanding of how to return a particular screen of interest in the system.

Thus, it would be desirable to provide interactive program guide systems and related processes that include a menu that may be invoked by the viewer from any screen of the interactive program guide, where the menu is used by the viewer to navigate through the various screens of the interactive program guide.

It would also be desirable to provide interactive program guide systems and related processes in which the telecasting service could define the available menu choices.

SUMMARY OF THE INVENTION

It is an object of this invention to provide interactive program guide systems and related processes that allow a viewer to apply a nonrestrictive sort attribute to program schedule information in addition to, or as an alternative to, a restrictive selection criterion.

It is also an object of this invention to provide interactive program guide systems and related processes in which the telecasting service can define nonrestrictive sort attributes and restrictive selection criteria that the viewer can apply to the program schedule information.

It is another object of this invention to provide interactive program guide systems and related processes in which the telecasting service can define different sets of nonrestrictive sort attributes for the viewer to choose from depending upon a restrictive selection criterion applied to the program schedule information by the viewer.

It is a further object of this invention to provide interactive program guide systems and related processes that contemporaneously display, on a single screen, the nonrestrictive sort attributes and restrictive selection criteria available for the viewer to choose from, along with the program schedule information that meets the restrictive selection criterion chosen by the viewer in the sort order defined by the selected sort attribute.

It is even a further object of this invention to provide interactive program guide systems and related processes that provide a graphical user interface for displaying the dates for which program schedule information is available, and for allowing the user to select program schedule information for a particular date.

It is still a further object of this invention to provide interactive program guide systems and related processes that include a menu that may be invoked by the viewer from any screen of the interactive program guide, where the menu is used by the viewer to navigate through the various screens of the interactive program guide.

It is yet a further object of this invention to provide interactive program guide systems and related processes in which the telecasting service can define the available menu choices.

In accordance with this invention, interactive program guide systems and related processes are provided which can automatically tune a television, or program a VCR, based on program selections made from program schedule information displayed on a television or other suitable video monitor. The interactive program guide is implemented preferably using a microprocessor-controlled set-top box that is coupled to the viewer's television set. The set-top box receives program schedule information and software from a headend telecasting center. Preferably, program schedule information for the current day and at least six subsequent days is stored in a memory within the set-top box. The program schedule information used in connection with the present invention may be generic, in the sense that the data comprising the program schedule information may be used for other purposes, such as by other set-top boxes having capabilities different from or additional to those described above. Preferably, the program schedule information includes program titles, telecast times, channels, program descriptions, and other useful information.

The interactive program guide of the present invention operates in several different viewer-selectable display modes in order to present to, and acquire information from, a viewer. The primary display mode is the Program Guide display mode. In this mode, the interactive program guide presents program schedule information in a familiar grid format. The viewer can use navigation keys on a remote control to move a cursor to a desired program. Once a program of interest has been located and highlighted by the cursor, the viewer can use the remote control to cause the set-top box to tune to the selected program ("point and tune"), or to schedule the program for later viewing or recording (if not yet being telecast).

The interactive program guide of the present invention also provides a Program Search display mode. The Program Search display mode may be used by the viewer to search a list of program schedule information for programs desired to be viewed or recorded, using a restrictive search selection criterion and a nonrestrictive sort attribute to the program schedule information. The interactive program guide advantageously provides a contemporaneous display of the available selection criteria and sort attributes, and the results obtained by applying a selection criterion and/or sort attribute to the program schedule information. Preferably, the selection criteria and sort attributes are defined by the headend telecasting center, and they are transferred to the set-top box as operational parameters along with the software used to implement the interactive program guide. The headend telecasting center may also define a default selection criterion and a default sort attribute which are automatically applied to the program schedule information when the Program Search display mode is invoked. Moreover, the nonrestrictive sort attributes available to the viewer may be a function of the particular restrictive user program selection criterion previously selected by the viewer.

The interactive program guide of the present invention also includes two display modes that facilitate viewer navigation in the Program Search display mode. The first, referred to as the Day to View display mode, is used to navigate the ProgramGuide display mode to program schedule information for a particular date, and even more specifically to a particular range of hours (i.e., "day part") for that selected date. The second, referred to as the Favorite Channel display mode, allows the viewer to define a favorite channel line-up. After the viewer establishes a favorite channel line-up, the program schedule information displayed in the Program Guide display mode is sorted in accordance with the channels selected by the viewer. The favorite channel line-up is preferably nonrestrictive. That is, the channels selected by the viewer are moved to the beginning of the program guide in the sequence selected by the viewer, with the other channels following thereafter. The viewer's favorite channel line-up is preferably not applied in the Program Search display mode.

The interactive program guide of the present invention also provides a convenient menu (referred to herein as a "quickmenu") that the viewer can invoke from any of the above-described display modes. The quickmenu includes menu choices that allow the viewer to quickly switch from one of the above-described display modes to another. In addition to the display mode choices, the quickmenu also includes menu choices that operate as short-cut navigation tools in the Program Guide display mode. For example, the viewer can select a quickmenu choice that causes the interactive program guide to automatically navigate the program grid to programs scheduled for telecast during prime time (e.g., starting at 7:00 PM) irrespective of the current time. The quickmenu may also include context sensitive menu choices which are defined in accordance with the display mode from which the quickmenu is invoked. The available quickmenu choices, including default menu choices (i.e., the choices displayed when the quickmenu is invoked) are preferably defined by the headend telecasting center and transmitted to the set-top box as operational parameters.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIGS. 3–10 are sample screen displays which illustrate the operation of the interactive program guide of the present invention;

FIG. 29 is a sample screen display which illustrates the operation of an alternative embodiment of the interactive program guide of the present invention; and FIGS. 30–33 are sample screen displays which illustrate the operation of an abbreviated program guide provided in accordance with the present invention.

DETAILED DESCRIPTION OF THE INVENTION

Figure 1:
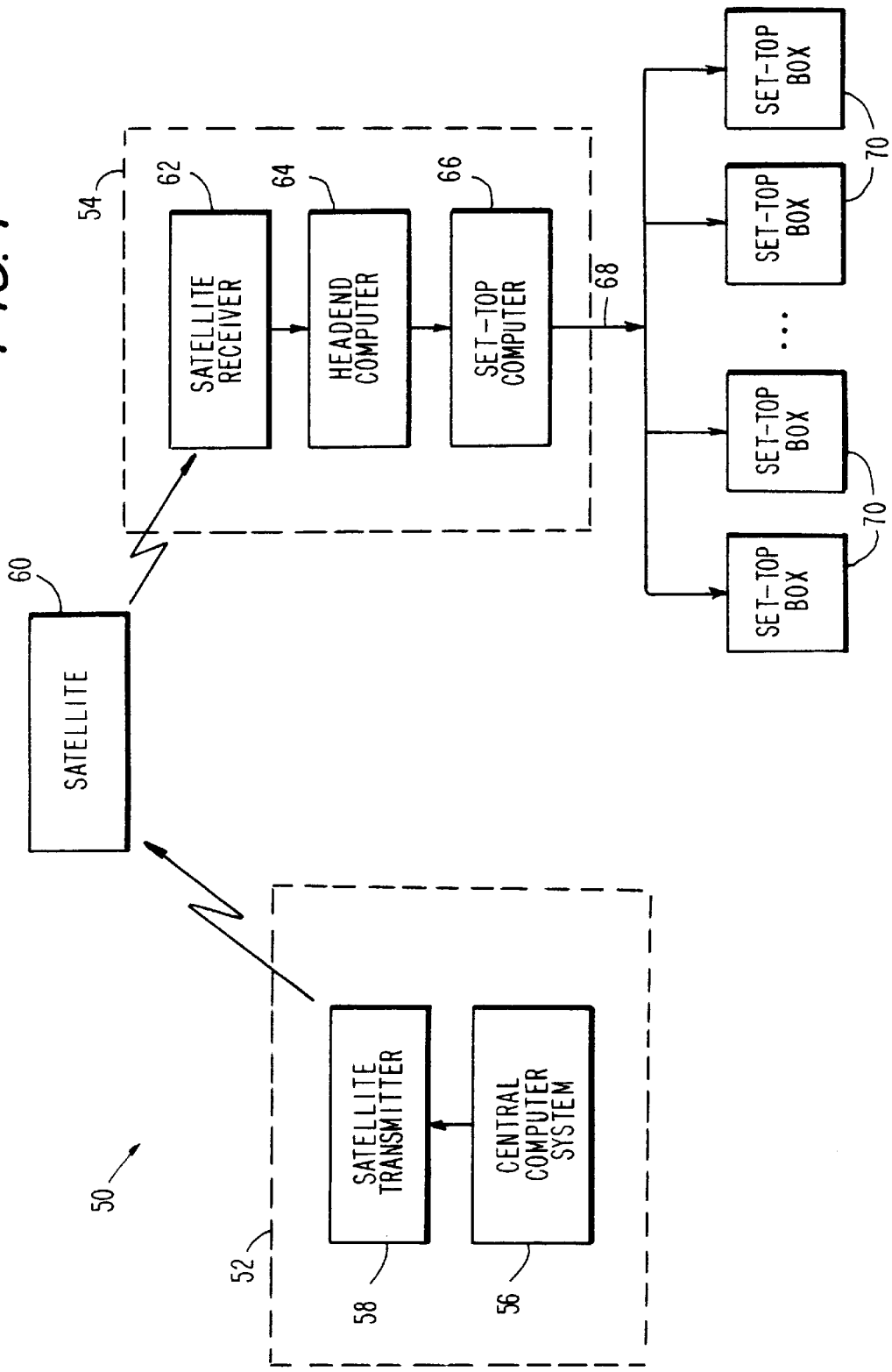
FIG. 1 is a block diagram of a telecasting system which may provide the interactive program guide of the present invention.

Referring first to FIG. 1, a system 50 which provides the interactive program guide of the present invention is described. It should be understood, however, that although the invention is described in the context of a conventional cable telecasting system, the principles described herein also apply to satellite telecasting systems, as well as other systems that are suitable for providing television services to viewers.

The system 50 includes a data center 52 and a headend telecasting center 54. The data center 52 includes a central computer system 56 for updating and storing program schedule information. The program schedule information maintained by the central computer system 56 is "complete" in the sense that it includes data to be used by all telecasting services that provides the interactive program guide of the present invention. The data are also generic, in the sense that they may be used by other systems not implementing the present invention. The program schedule information may be supplied to the central computer system 56 through manual data entry (e.g., a keyboard) or it may be provided from outside sources via magnetic media (e.g., tape or disk), modem link or any other suitable data transfer mechanism. Program schedule information includes at least program channels, titles, and telecast times and may include also program descriptions, telecast call signs, themes, and other information that may be used to classify programs into one or more categories.

Using a satellite transmitter 58, the data center 52 transmits the program schedule information to the headend telecasting center 54 via a satellite 60. The program schedule information is received by a satellite receiver 62, which in turn transfers the data to a headend computer 64. Preferably, the data center 52 provides a continuous feed of program schedule information to the headend telecasting center 54, so that the headend telecasting center can quickly recover from any unexpected loss of data. The continuous feed also ensures that the headend telecasting center 54 is provided with any updates to the program schedule information soon after they are made. The data center 52 preferably provides program schedule information to the headend telecasting center 54 for the current day and at least six additional days following the current day.

As mentioned above, the data center 52 transmits program schedule information for all telecasting services that provide the interactive program guide of the present invention. However, cable operators likely will not want viewers to see program schedule information for channels that they do not receive. Therefore, one function performed by the headend computer 64 is selection of program schedule information for only those channels that are offered by the headend telecasting center 54.

The "reduced" set of program schedule information is supplied to a set-top computer 66. The set-top computer 66 formats the program schedule information for transmission on a cable network 68 along with television program signals on a plurality of channels. (The formatted data also are generic, in the sense that a set-top box not implementing the present invention could use the formatted data for other purposes.) A plurality of set-top boxes 70 coupled to the cable network 68 receive the television program signals and the program schedule information.

Any conventional method of transmitting the program schedule information with the television program signals may be used in connection with the present invention. Preferably, an out-of-band channel (e.g., channel 0) is used to provide a continuous feed transmission of the program schedule information on the cable network 68. The continuous feed transmission of the program schedule information allows for quick restoration of the interactive program guide in the event a set-top box 70 experiences a power interruption. It also provides for prompt updating of schedule information in the event schedule changes are made at the data center 52. Alternatively, the program schedule information may be transmitted using the vertical blanking interval (VBI) of one, some or all of the program channels provided by the headend telecasting center.

In addition to the program schedule information, the headend telecasting center 54 may also transmit software modules and operational parameters used by the set-top boxes 70 to implement the interactive program guide of the present invention. Furthermore, the software modules and operational parameters may originate from the data center 52 rather than the headend telecasting center 54. The operational parameters may include, for example, nonrestrictive sort attributes, restrictive selection criteria, menu choices, and default menu selections (all of which are described in greater detail below).

Figure 2:
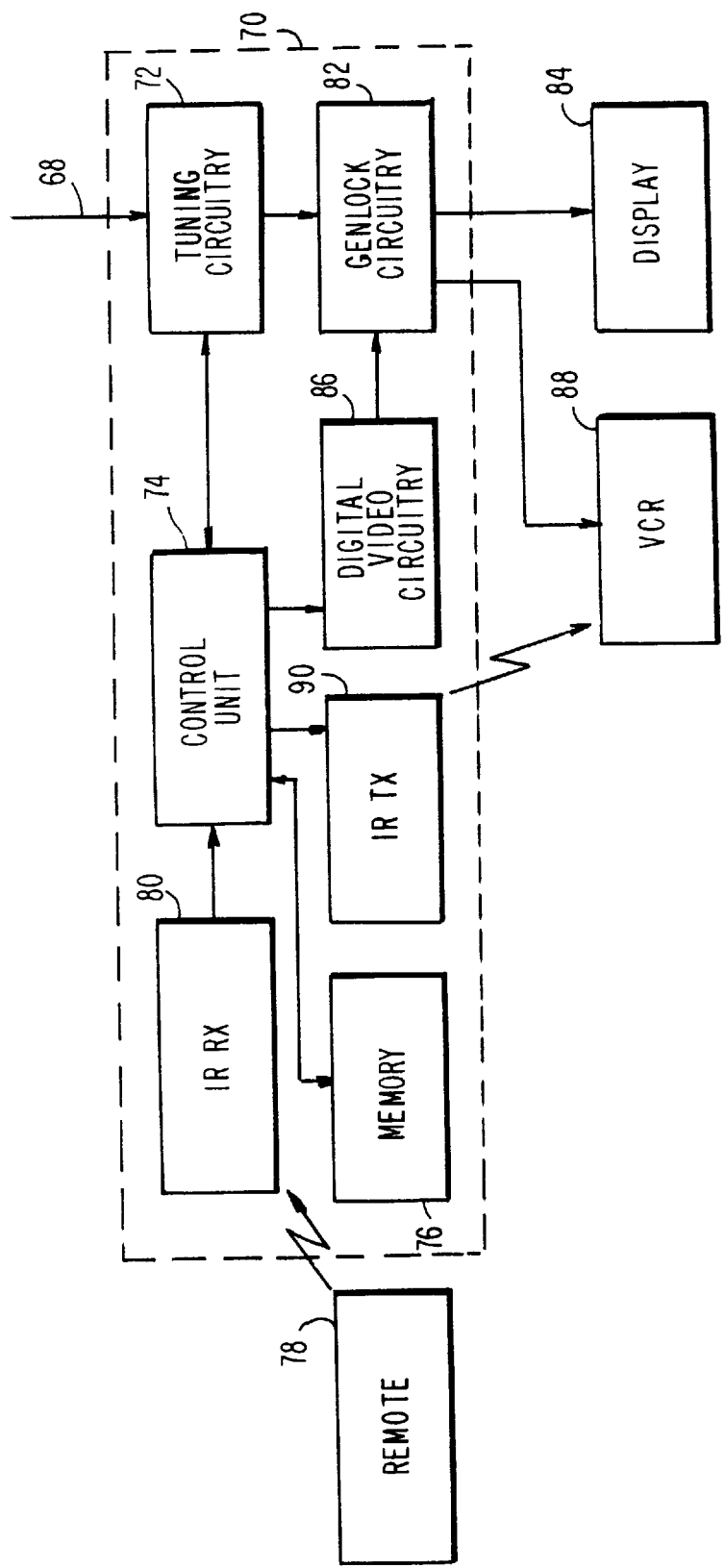
FIG. 2 is a block diagram of a set-top box suitable for implementing the interactive program guide of the present invention.

Turning now to FIG. 2, a set-top box 70 suitable for implementing the interactive program guide of the present invention is described. Television signals, program schedule information, operational parameters, and software modules transmitted on the cable network 68 are first received by tuning circuitry 72. The tuning circuitry 72 processes the incoming signals in a conventional manner to extract the program schedule information, operational parameters, and software modules. The program schedule information, operational parameters, and software modules are provided to a control unit 74, which is preferably microprocessor-based. The control unit 74 stores the program schedule information, operational parameters, and software modules in a memory 76. The memory 76 is preferably random access memory (RAM), but it may also include read only memory (ROM) or flash memory to provide the control unit 74 with the instructions necessary to perform the initial loading of program schedule information, operational parameters, and software modules into the memory 76 when the set-top box 70 is turned on. After the memory 76 is loaded, it preferably contains program schedule information for the current day and at least six subsequent days.

In addition to directing the program schedule information, operational parameters and software modules to the control unit 74, the tuning circuitry 72 also tunes the set-top box 70 to a program channel selected by the viewer. The viewer can make channel selections by using a remote control 78 that communicates with the control unit 74 through an infrared receiver 80. Upon receiving the viewer's channel selection, the control unit 74 causes the tuning circuitry 72 to tune to the selected channel. The television signals on the selected channel are received by generator synch lock ("genlock") circuitry 82. When the interactive program guide is not on, the television signals on the selected channel pass through the genlock circuitry 82 and are received by a display 84, which is preferably a conventional television set. The display 84 displays the television program on the selected channel.

The remote control 78 may also be used by the viewer to invoke the interactive program guide of the present invention. When the control unit 74 receives the appropriate command, it retrieves at least a portion of the program schedule information from the memory 76. The control unit 74 provides the retrieved data to digital video circuitry 86 which converts the digital data to video signals. The interactive program guide video signals are then provided to the genlock circuitry 82 which synchronizes those signals to the television signals received from the tuning circuitry 72. The interactive program guide appears as an overlay on the television program that was being displayed on the display 84. As the viewer uses the remote control 78 to navigate in the interactive program guide, the appropriate program schedule information is retrieved from the memory 76 by the control unit 74, and ultimately displayed on the display 84. When the viewer deselects the interactive program guide, the control unit 74 stops providing data to the digital video circuitry 86, and the interactive program guide disappears.

The interactive program guide can be used by the viewer to select programs of interest for display on the display 84. The interactive program guide may also be used to program a video cassette recorder (VCR) 88. The control unit 74 preferably exerts control over the VCR 88 through the use of an infrared transmitter 90 which communicates with an infrared receiver (not shown) of the VCR 88. Control preferably includes starting and stopping recording by the VCR 88, and it may also include channel selection as well as other more advanced control commands.

In FIG. 2, the display 84 and the VCR 88 are shown connected to the genlock circuitry 82. Other arrangements are possible. For example, the VCR can be connected to the genlock circuitry 82 and the display 84 can be connected to the VCR. However, if the viewer wishes to record and view different programs at the same time, the VCR 88 can be connected directly to the cable network 68. The invention also contemplates the use of a set-top box (not shown) that includes two tuners—one each for the VCR 88 and the display 84.

In many respects the remote control 78 used with the set-top box 70 may be conventional. For example, the remote control 78 may include a series keys numbered 0 through 9 which may be used by the viewer to cause the tuning circuitry 72 to tune to a particular channel. Preferably, the remote control 78 includes the following nine additional keys for use in connection with the interactive program guide:

| Remote Control Keys | |
| --- | --- |
| Guide | Left Arrow |
| Menu | Right Arrow |
| Select | Page Forward |
| Up Arrow | Page Backward |
| Down Arrow | |

The interactive program guide of the present invention preferably uses several different display modes in order to present and acquire information from the viewer. When the viewer presses the Guide key on the remote control 78, the interactive program initially enters a "Program Guide" display mode.

FIG. 3 depicts a program guide screen 100 that is presented on the display 84 when the Program Guide mode is initially invoked (i.e., by pressing the Guide key on the remote control 78). The program guide screen 100 adopts the familiar grid format for presenting program schedule information to viewers. The screen 100 includes a time bar 102 that is divided into a plurality of horizontally arranged time cells 104 and a date cell 106. Each time cell 104 corresponds to a one half hour time period of television programming. The date cell 106 identifies the telecast date for the displayed program schedule information.

The screen 100 also includes a channel bar 108 that is divided into a plurality of vertically arranged channel cells 110. The channel cells 110 identify the channels on which the displayed programs are to be (or are being) telecast.

The screen 100 further includes a program grid 112. Essentially, the program grid 112 displays at any given time, a subset of the program schedule information stored in the memory 76 (FIG. 2). The program grid 112 is divided into a plurality of program cells 114. Each program cell 114 contains information pertaining to a particular television program. In the preferred embodiment, this information always includes the program title, but as shown, the information for any particular program may also include release year, MPAA rating (for movies), theme, etc. The length of each program cell 114 corresponds to the length of the program named therein, and may span more than one time period. Thus, the viewer can easily determine the start time, stop time and length of each program by simply comparing the boundaries of the particular program cell 114 of interest to the time bar 102.

When the Program Guide display mode is initially invoked by pressing the Guide key on the remote control 78 (FIG. 2), the screen 100 also includes a menu overlay or "quickmenu" 116. The quickmenu 116 can also be invoked from any display mode of the interactive program guide by pressing the Menu key on the remote control 78 (FIG. 2). The quickmenu 116 contains a plurality of menu choices which allow the viewer to control the operation of the interactive program guide. Only three menu choices are displayed at any given time—one in each of a current choice cell 118, a previous choice cell 120, and a next choice cell 122.

The viewer uses the Left and Right Arrow keys on the remote control 78 (FIG. 2) to navigate in the quickmenu 116. Pressing the Left Arrow key moves the menu choice previously contained in the next choice cell 122 to the current choice cell 118. Pressing the Right Arrow key moves the menu choice previously contained in the previous choice cell 120 to the current choice cell 118. In this manner, the viewer can scroll through the various menu choices until the desired menu choice is located. The quickmenu 116 preferably operates in an endless-loop fashion. When the desired menu choice appears in the current choice cell 118, the viewer presses the Select key to activate the choice.

There are two ways to remove the quickmenu 116 from the screen 100 (or from any other screen that the quickmenu 116 is displayed on). The Menu key on the remote control 78 (FIG. 2) acts as a toggle, so that when the quickmenu 116 is displayed, the Menu key having first been pressed, pressing the Menu key again removes it. The viewer can also clear the quickmenu 116 by pressing the Up Arrow key. When the quickmenu 116 is cleared, the viewer can navigate in the underlying screen as appropriate for the current display mode.

Below the quickmenu 116 is a title bar 124. The title bar 124 includes a clock cell 126 which displays the current time. The title bar 124 also contains context sensitive information. For example, when the quickmenu 116 is displayed, the title bar 124 contains simple yet intuitive instructions on how to use the quickmenu 116.

The menu choices available in the quickmenu 116 can be broadly categorized into two groups. The first group of choices provides the viewer with shortcuts for navigating in the Program Guide display mode. In the preferred embodiment, there are three shortcut choices or "navigation points" referred to as "Hot Picks," "What's On" and "Prime Time." Selection of a navigation point from the quickmenu 116 simply results in a change in the data displayed in the screen 100 without changing the display mode (i.e., the display mode remains Program Guide). The second group of choices are used by the viewer to select from among the plurality of display modes used in the interactive program guide. In the preferred embodiment, the display mode choices are "Program Guide," "Program Search," "Day To View" and "Favorite Channel."

Referring now to FIG. 4, the program guide screen 100 is shown as it may appear when the Hot Picks navigation point is selected. It should also be noted that the Hot Picks navigation point is automatically selected by the control unit 74 (FIG. 2) when the viewer invokes the interactive program guide by pressing the Guide key on the remote control 78 (FIG. 2). With the quickmenu 116 (FIG. 3) not displayed, the title bar 124 informs the viewer that the quickmenu 116 (FIG. 3) can be invoked by pressing the Menu key.

As shown in FIG. 4, selection of the Hot Picks navigation point causes the interactive program guide to present a "premium channel line-up." The premium channel line-up includes program schedule information for programs available on premium channels during prime time (e.g., starting at 7:00 PM) on the current date (and not dependent on either the current time period or the current channel to which the tuning circuitry 72 (FIG. 2) is tuned). Preferably, the premium channel line-up fits in one screen (i.e., the viewer does not need to scroll the program grid 112 in order to see program schedule information for additional premium channels). The designation of particular channels as "premium channels" is preferably accomplished through the use of operational parameters stored in the memory 76 (FIG. 2). The premium channel designations may be made at the headend telecasting center 54 (FIG. 1) in order to provide a consolidated presentation of program schedule information that may be of local interest.

A program cell 127 is shown highlighted in FIG. 4 to indicate the location of a cursor in the program grid 112. The viewer can navigate in the program grid 112 (i.e., move the cursor) by using the Left, Right, Up, and Down Arrow keys on the remote control 78 (FIG. 2) in a conventional manner. For example, if the Right Arrow key is pressed while the program cell 127 is highlighted, the cursor moves to a program cell 128. The program cell 128 is then highlighted whereas the program cell 127 is no longer highlighted. If the Down Arrow key is pressed while either of the program cells 127 or 128 is highlighted, the cursor moves to a program cell 130.

The program grid 112, the time bar 102, and the channel bar 108 scroll as needed when the viewer attempts to move the cursor beyond the displayed program schedule information. For example, if the viewer presses the Left Arrow key while the program cell 127 is highlighted, the program grid 112 and the time bar 102 will scroll sufficiently far to the right to allow the display of program schedule information for the program scheduled for telecast immediately prior to the one indicated by the program cell 127. Continuation icons 132 indicate that particular programs start before or finish later than the times currently displayed in the time bar 102. The viewer can see when such programs start or end by scrolling the program grid 112 using the arrow keys corresponding to the directions indicated by the continuation icons 132.

From the viewer's perspective, the interactive program guide operates as though the premium channel line-up is prepended to a "main channel line-up" comprising schedule information for other available channels. In addition, program schedule information is preferably displayed in an endless loop fashion. By default, the main channel line-up comprises program schedule information for all available channels (including the designated premium channels) arranged sequentially by channel number. Thus, if the viewer presses the Down Arrow key while a program cell 134 is highlighted, the program grid 112 and the channel bar 108 advance such that program schedule information for the first channel in the main channel line-up (e.g., channel 2) appears in the last row of the program grid 112. On the other hand, if the Up Arrow key is pressed while the program cell 127 is highlighted, program schedule information for the last channel in the main channel line-up appears in the first row of the program grid 112. If the viewer then chooses to scroll through the entire main channel line-up, program schedule information for the premium channel line-up reappears in the program grid 112. It should be noted, however, that the present invention allows for viewer modification of the main channel line-up (by sorting) through the use of the Favorite Channel display mode (described below in connection with FIG. 9.)

The Page Forward and Page Backward keys are also used for navigating in the Program Guide display mode. (The Left Arrow, Right Arrow, Up Arrow, Down Arrow, Page Forward and Page Backward Keys are collectively referred to as "navigation keys.") For example, if the Page Forward key is pressed while the premium channel line-up is displayed, the program grid 112 and the channel bar 108 scroll such that the premium channel line-up is replaced with program schedule information for the first six channels in the sequential channel line-up. If the Page Backward key is pressed instead, the program schedule information for the last six channels in the sequential channel line-up is displayed.

The Select key on the remote control 78 (FIG. 2) is used by a viewer to select a highlighted program. After a program has been selected, the viewer can choose to tune to the selected program, record the selected program, or simply see more information about the selected program. These features are described in greater detail below in connection with FIG. 10.

FIG. 5 depicts the program guide screen 100 as it appears when the viewer selects the Prime Time navigation point from the quickmenu 116 (FIG. 3). Prime time program schedule information for the date shown in the date cell 106 is displayed for the main channel line-up, starting with the first channel (e.g., channel 2). The hours constituting "Prime Time" are defined by operational parameters stored in the memory 76 (FIG. 2); therefore, they may be set by either the data center 52 (FIG. 1) or the headend telecasting center 54 (FIG. 1). The display starts at the beginning of prime time and at the lowest channel (without regard to the current time period or the channel to which the tuning circuitry 72 (FIG. 2) is currently tuned). If Prime Time is selected for the current date, and the current time period is later than the starting Prime Time hour defined by the operating parameters, the program grid 112 preferably displays program schedule information starting at the beginning of prime time if the data are still available. If the data have been discarded because they are no longer valid, program schedule information is displayed starting at the beginning of the database. Alternatively, the invention may be implemented so that the next prime time period (tomorrow's) is displayed.

In the example shown in FIG. 5, the time bar 102 indicates that prime time scheduling has been set to start at 7:00 PM. A program cell 136 is shown highlighted to indicate the location of the cursor. The viewer can use the six navigation keys on the remote control 78 to navigate in the program grid 112, as described above in connection with FIG. 4. The viewer can even use the navigation keys to scroll back to the Hot Picks navigation point, if so desired. However, the viewer may prefer instead to invoke the quickmenu 116 (FIG. 3) by pressing the menu button in order to take advantage of the Hot Picks menu selection. The same data are made available to the viewer regardless of which method of navigation is used. Thus, the selection of navigation points from the quickmenu 116 (FIG. 3) has no effect on the underlying data. They simply allow the viewer to move quickly from one point to another while in the Program Guide display mode.

In the preferred embodiment, use of either the Hot Picks or Prime Time navigation point from the quickmenu 116 (FIG. 3) results in a display of program schedule information beginning with the prescribed starting prime time hour (e.g., 7:00 PM) without regard to the current time period or the channel to which the tuning circuitry 72 (FIG. 2) is tuned. The navigation keys may then be used by the viewer to horizontally scroll the program grid 112 and the time bar 102 to display program schedule information for other time periods—including the current time period (if the current time period is earlier than the starting prime time hour). The navigation keys on the remote control 78 (FIG. 2) can also be used to scroll to program schedule information corresponding to programs scheduled for telecast on later dates. The date cell 106 automatically displays the date corresponding to the program schedule information displayed in the program grid 112.

FIG. 6 depicts the program guide screen 100 as it appears when the viewer selects the What's On navigation point from the quickmenu 116 (FIG. 3). Program schedule information corresponding to the main channel line-up is displayed in the program grid 112, starting at the half hour time period immediately preceding the current time period. Navigation is accomplished in the same manner described above in connection with FIGS. 4 and 5. The Menu key remains available for invoking the quickmenu 116 (FIG. 3). The Select key is used to select the highlighted program for viewing or recording, or to display additional information about the highlighted program.

In an alternative embodiment of the invention, selection of the What's On navigation point causes a display of program schedule information starting at the time period following the current time period. Thus, if the current time period is the 2:00 PM time period, program schedule information is displayed in the program grid 112 (FIGS. 3–6) starting at the 2:30 PM time period.

Yet another alternative embodiment is described in connection with FIG. 29. In this embodiment, a Program Guide screen 140 includes a time bar 142, a channel bar 144, and a program grid 146 that operate in substantially the same manner as described above in connection with FIGS. 3–6. However, in this embodiment, the program grid 146 includes a navigation cell 148 that preferably contains at least two icons representing navigation points. The icons may represent any of the navigation points discussed above, but in this example, the navigation cell 148 includes a "What's On" icon 150 and a "Hot Picks" icon 152. The icon 150 is shown highlighted, indicating the location of a cursor. The viewer can navigate the cursor from any of the program cells in the program grid 146 to either of the icons 150 and 152 using the navigation keys on the remote control 78 (FIG. 2), as described above.

Unlike the program cells contained in the program grid 146, the navigation cell 148 may be viewed as "stationary" in that it does not move with the rest of the program cells as the viewer navigates in the program grid 146. Rather, the navigation cell 148 preferably remains in the lower right corner of the program grid 146, even as the channels and times change in the channel bar 144 and the time bar 142, respectively. Thus, the viewer is always able to navigate the cursor to one of the icons 150 and 152 displayed in the navigation cell 148.

Pressing the Select key on the remote control 78 (FIG. 2) while one of the icons 150 or 152 is highlighted causes the interactive program guide to navigate the program grid 146 to the navigation point indicated in the selected icon. For example, after the What's on icon 150 is selected, the interactive program guide navigates the program grid 146 to the current time period. If the Hot Picks icon 152 is selected, the program grid 146 then displays program schedule information for the premium channel line-up starting at the earliest prime time hour defined by the operational parameters. Essentially, selecting an icon from the navigation cell 148 has the same effect as selecting the corresponding navigation point from the quickmenu 116 (FIG. 3). The advantage offered by this embodiment is that the viewer does not have to invoke the quickmenu 116 (FIG. 3) in order to rapidly navigate to a desired location in the program schedule information.

Turning now to FIG. 7, a program search screen 200 is described. The program search screen 200 appears on the display 84 (FIG. 2) when the viewer selects the Program Search display mode from the quickmenu 116 (FIG. 3). In accordance with the invention, the Program Search display mode allows the viewer to chose a restrictive search selection criterion and a nonrestrictive sort attribute. The selection criterion and sort attribute are applied to the program schedule information to assist the viewer in locating programs of interest.

Like the screen 100 (FIGS. 3–6), the screen 200 includes the title bar 124. The title bar 124 contains the clock cell 126 displaying the current time, and an indication that the viewer can invoke the quickmenu 116 (FIG. 3) by pressing the Menu key on the remote control 78 (FIG. 2). When the Menu key is pressed, the quickmenu 116 (FIG. 3) appears immediately above the title bar 124, partially covering some of the other information on the screen 200. The quickmenu 116 (FIG. 3) operates in the Program Search display mode in the same manner described above for the Program Guide display mode.

When the quickmenu 116 (FIG. 3) is not displayed, the area above the title bar 124 in the screen 200 is divided into three functional regions—a search selection menu 202, a sort menu 204, and a program menu 206. The search selection menu 202 is used by the viewer to choose a single restrictive search selection criterion from a plurality of available search selection criteria. The sort menu 204 is used by the viewer to choose a single nonrestrictive sort attribute from a plurality of available sort attributes. Program schedule information corresponding to programs that meet the chosen search selection criterion are displayed in the program menu 206 in the order indicated by the chosen sort attribute. It should be noted that although the preferred embodiment of the invention uses only a single selection criterion and a single sort attribute, combinations of multiple selection criteria with a single sort attribute, or a single selection criterion with multiple sort attributes, or multiple selection criteria with multiple sort attributes may be used without departing from the spirit of the invention.

When the screen 200 first appears on the display 84 after the Program Search display mode is selected from the quickmenu 116 (FIG. 3), an active selection criterion cell 208 appears highlighted, representing the location of a cursor. The presence of the cursor in the search selection menu 202 means that the viewer can interact with the menu 202 by using the Up and Down Arrow Keys on the remote control 78 (FIG. 2). By using the Left and Right Arrow Keys, the viewer can move the cursor to the sort menu 204 or the program menu 206. Whichever one of the menus 202, 204, or 206 contains the cursor is the active menu (i.e., the menu that the viewer can interact with).

When the search selection menu 202 is active, the viewer can use the Up and Down Arrow keys to choose a single search selection criterion from among the available selection criteria. Pressing the Down Arrow Key causes the selection criterion displayed in a next search cell 210 (e.g., "Drama") to appear in the active selection criterion cell 208. Pressing the Up Arrow Key causes the selection criterion displayed in a previous search cell 212 to appear in the active selection criterion cell 208. The search selection menu 202 preferably operates in an endless loop fashion, with additional selection criteria being displayed as the viewer scrolls the menu 202. The available selection criteria are stored as operational parameters in the memory 76, which, as explained above, may be defined by either the data center 52 (FIG. 1) or the headend telecasting center 54 (FIG. 1). Selection criteria may include, but are not limited to, Movies, Drama, Action, Science Fiction, Comedy, Sports, TV, Documentaries, Pay Per View, On in Next Hour, etc. The order in which the available selection criteria are presented is also determined by the operational parameters. In addition, the "default selection criterion" (i.e., the selection criterion that appears in the active selection criterion cell 208 when the Program Search display mode is invoked) is also defined by the operational parameters. Thus, the data center 52 (FIG. 1) or the headend telecasting center 54 can set the default selection criterion to a selection criterion that may be of interest to a large segment of the viewing population. For example, it may be desirable to set the default selection criterion to Pay Per View if a popular movie is being shown that evening. Programs meeting the default search selection criterion are made available for viewer selection in the program menu 206 when the screen 200 is displayed after the Program Search display mode is selected.

The selection criterion that appears in the active selection criterion cell 208 is preferably automatically applied to the program schedule information to present a listing of program schedule information meeting the single selection criterion. In other words, the viewer does not need to press the Select key (or any other key) in order to apply the search selection criterion to the program schedule information. Rather, programs that meet the active search selection criterion are made available for user selection in the program menu 206 as the viewer scrolls the search selection menu 202. Thus, each time the Up Arrow or Down Arrow Key is pressed, the program schedule information displayed in the program menu 206 changes in accordance with the new selection criterion displayed in the active selection criterion cell 208. Search selection is restrictive in the sense that programs which do not meet the active search selection criterion are not made available for viewer selection in the program menu 206. In an alternative embodiment, the selection criterion is not automatically applied to the program schedule information. Rather, the criterion is not applied until the viewer presses the Select key.

When the viewer moves the cursor to the sort menu 204, an active sort attribute cell 214 is highlighted (the highlighting is not shown in FIG. 7). When the active sort attribute cell 214 is highlighted, the viewer can use the Up and Down Arrow keys to select a sort attribute to be applied to the program schedule information displayed in the program menu 206. Pressing the Down Arrow key causes the sort attribute displayed in a next sort cell 216 to appear in the active sort attribute cell 214. Pressing the Up Arrow key causes the sort attribute displayed in a previous sort cell 218 to appear in the active sort attribute cell 214. Like the search selection menu 202, the sort menu 204 preferably operates in an endless-loop fashion.

Unlike the search selection criteria, the sort attributes are nonrestrictive and do not operate to select program schedule information to be presented in the displayed list of program schedule information. Thus, when the viewer changes the sort attribute, the result is simply a change in the order in which programs meeting the active search selection criterion are displayed in the program menu 206.

The sort attributes available for viewer selection are defined by the operational parameters stored in the memory 76 (FIG. 2). The default sort attribute (i.e., the one that is active when the Program Search display mode is invoked) is also defined by the operational parameters. Moreover, the operational parameters may define a different set of sort attributes for each search selection criterion. For example, if the selection criterion displayed in the active selection criterion cell 208 is "Movies", the sort attributes available in the sort menu 204 may include certain generic sort attributes such as sort by "Telecast Time," "Alphabetize," and sort in "Channel" order, but it may also include sort by "Rating." Since "Rating" normally would not apply to the selection criterion "Sports," it is not made available in the sort menu 204 when "Sports" is the active selection criterion. Instead, the sort menu 204 may offer sort by "Sport" as a sort attribute, which if selected, would cause the sports programs to be grouped by sport (e.g., baseball, football, soccer, etc.). The order in which the sports are presented is determined by the operational parameters.

The program menu 206 displays program schedule information for programs that meet the active search selection criterion, in an order determined by the active sort attribute. The user can navigate in the program menu 206 when one of the program choice cells 220 is highlighted (indicating the presence of the cursor).

The program menu 206 includes a menu header 222 that identifies the number of programs that meet the active search selection criterion. At least one group header 224 is also displayed in the program menu 206. The group headers 224 identify the subgroups resulting from the application of the active sort attribute to the program schedule information.

The program choice cells 220 preferably contain the program titles, telecast times, and channels (call signs or channel numbers) of programs that meet the active search selection criterion. However, if the active sort attribute is "Telecast Time," the telecast times are preferably displayed in the group headers 224 instead of the program choice cells 220. Similarly, if the active sort attribute is "Channel," the call signs are preferably displayed in the group headers 224 instead of the program choice cells 220.

The viewer uses the Up and Down Arrow keys to navigate in the program menu 206. The cursor appears only on the program cells 220 (not the group headers 224). In order to view more program schedule information meeting the active search selection criterion, the viewer can scroll the program menu 206 by pressing the Up Arrow key while the cursor is on the first displayed program, or the Down Arrow key while the cursor is on the last displayed program. The program menu 206 preferably operates in an endless-loop fashion.

In order to select a program for viewing or recording, or to see additional information about a program, the viewer presses the select key while the program choice cell 220 corresponding to a program of interest is highlighted. These features are described in greater detail below in connection with FIG. 10.

As mentioned above, the quickmenu 116 (FIG. 3) is preferably context sensitive. When the quickmenu 116 (FIG. 3) is invoked from the Program Search display mode, it preferably includes a menu selection identified as "Return." Like the above-described navigation points, selection of the Return menu choice invokes the Program Guide display mode. However, when Return is selected, the screen 100 (FIGS. 3–6) includes program schedule information corresponding to the program identified in the last program choice cell 220 highlighted in the program menu 206. This useful feature allows the viewer to consider other programs that may be scheduled for telecast at the same time as the highlighted program before making a selection.

Figure 8:
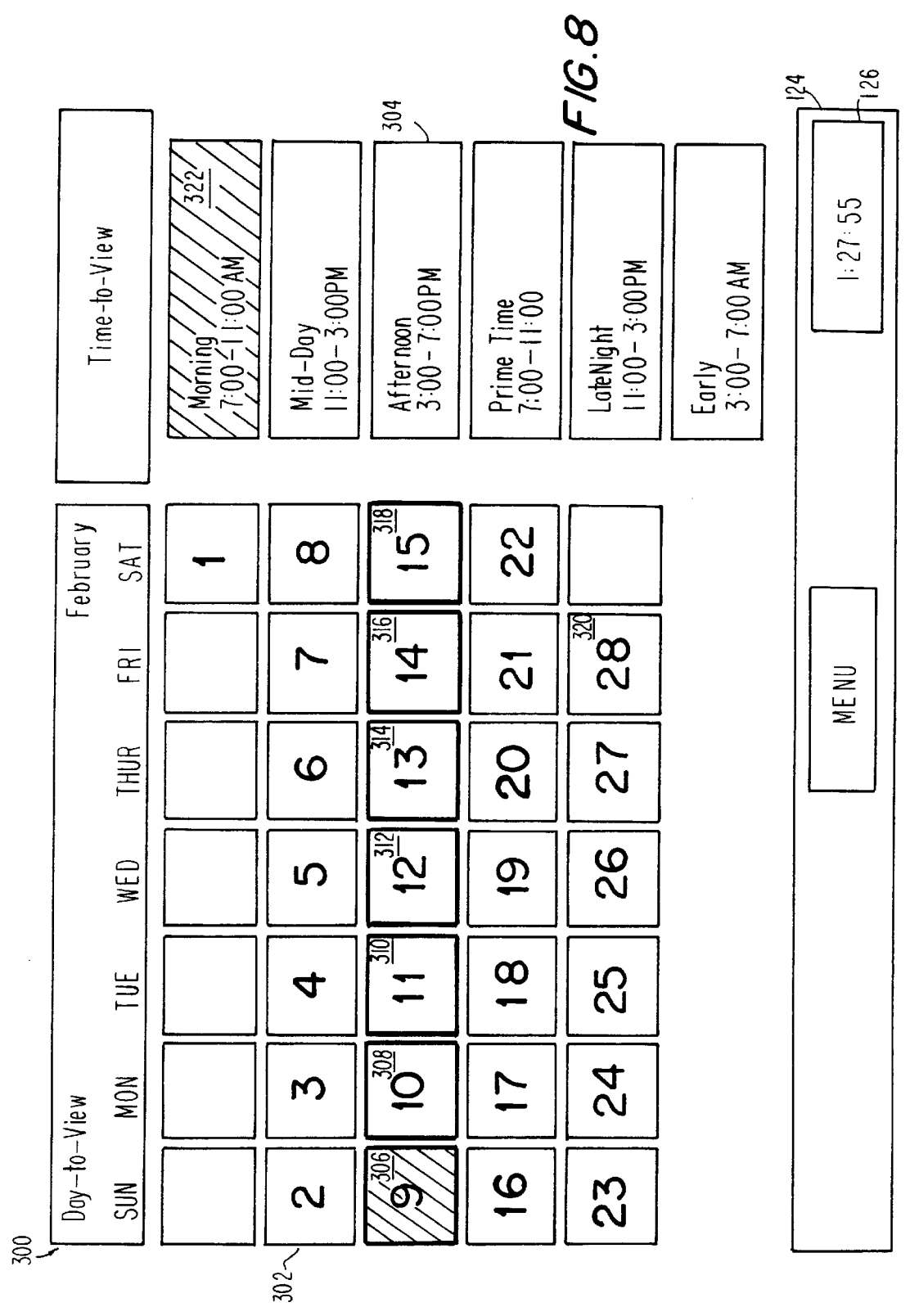

Referring now to FIG. 8, a day to view screen 300 is described. The day to view screen 300 appears on the display 84 (FIG. 2) when the viewer selects the Day to View display mode from the quickmenu 116 (FIG. 3). In accordance with the invention, the Day to View display mode provides a convenient graphical user interface that allows the viewer to quickly navigate to program schedule information for programs to be telecast (or being telecast) on a specified date. The Day to View display mode provides for even more precise navigation by allowing the viewer to specify a day part (i.e., a range of hours) for the specified date. When the viewer returns to the program guide screen 100 (FIGS. 3–6) after specifying a date and day part using the screen 300, the program grid 112 navigates to program schedule information for the specified date and day part. However, it should be noted that the specified date and day part do not limit the amount of or in any sense restrictively select the program schedule information available or displayed to the viewer (i.e., they are not restrictive selection criteria). Rather, the Day to View display mode operates as a positioning tool.

Like the screen 100 (FIGS. 3–6), the screen 300 includes the title bar 124. The title bar 124 contains the clock cell 126 displaying the current time, and an indication that the viewer can invoke the quickmenu 116 (FIG. 3) by pressing the Menu key on the remote control 78 (FIG. 2). When invoked, the quickmenu 116 (FIG. 3) appears immediately above the title bar 124. The quickmenu 116 (FIG. 3) operates in the Day to View display mode in the same manner described above for the Program Guide display mode.

The area of the screen 300 above the title bar 124 contains two viewer menus—a calendar menu 302 and a day part menu 304. The calendar menu 302 resembles a conventional monthly calendar. The month selected for display in the calendar menu 302 is a month having dates for which program schedule information is available.

The heavy borders around calendar cells 306, 308, 310, 312, 314, 316, and 318 indicate that the memory 76 (FIG. 2) contains program schedule information for programs to be telecast (or being telecast) on those dates. As shown in FIG. 8, the memory 76 (FIG. 2) preferably stores program schedule information for seven days starting with the current date (in this example, February 9–15). Of course, the amount of program schedule information made available to the viewer may be varied without departing from the spirit of the invention. The cell 306 is also highlighted, indicating the presence of a calendar cursor. When the Day to View display mode is invoked, the cursor is placed in the cell corresponding to the last date for which program schedule information was considered in the Program Guide display mode. Thus, if the Day to View display mode is invoked immediately after the interactive program guide is activated (i.e., before the viewer attempts to navigate in the Program Guide display mode), the cursor will appear in the cell representing the current date, which is the first of the heavily bordered cells. In the example shown in FIG. 8, the cell 306 represents the current date.

In order to select a new date, the viewer uses the Left and Right Arrow keys on the remote control 78 (FIG. 2) to move the cursor from one calendar cell to the next. The cursor can appear only in one of the heavily bordered cells 306, 308, 310, 312, 314, 316, and 318. When the cell 306 is highlighted, pressing the Left Arrow key moves the cursor to the cell 318. When the cell 318 is highlighted, pressing the Right Arrow key moves the cursor to the cell 306.

Toward the end of any given month, the available program schedule information extends into the next month. In this situation, the month displayed in the calendar menu 302 automatically changes as the viewer attempts to move the cursor from one month to the next. For example, if program schedule information is available for the period from February 27 through March 5, pressing the Right Arrow key while cell 320 (February 28) is highlighted causes the calendar 302 to switch to the next month. The cursor would appear on the cell for March 1 (not shown). Pressing the Left Arrow key while the cursor is on the cell for March 1 results in a redisplay of the February calendar in the calendar menu 302.

The day part menu 304 preferably includes a plurality of day part cells 322. In the example shown in FIG. 8, the day part menu 304 includes six day part cells 322 each representing four hours of program schedule information.

One of the day part cells 322 (the Morning cell) is highlighted to represent the location of a day part cursor. Similar to the calendar cursor, the day part cursor initially appears on the day part that was most recently considered in the Program Guide display mode (FIGS. 3–6). The viewer moves the day part cursor by pressing the Up or Down Arrow key on the remote control 78 (FIG. 2). Thus, the calendar cursor and the day part cursor are simultaneously displayed in the screen 300. However, they respond to different keys on the remote control 78 (FIG. 2). The cursor wraps around the day part menu 304 as needed.

After a date and day part have been selected, the viewer can return to the Program Guide display mode (FIGS. 3–6) to view program schedule information for the date and day part selected. This is accomplished by pressing the Select key, or by invoking the quickmenu 116 (FIG. 3) by pressing the Menu key, and then selecting the context sensitive menu choice "Return." The program grid 112 then navigates to the selected date and day part.

Figure 9:
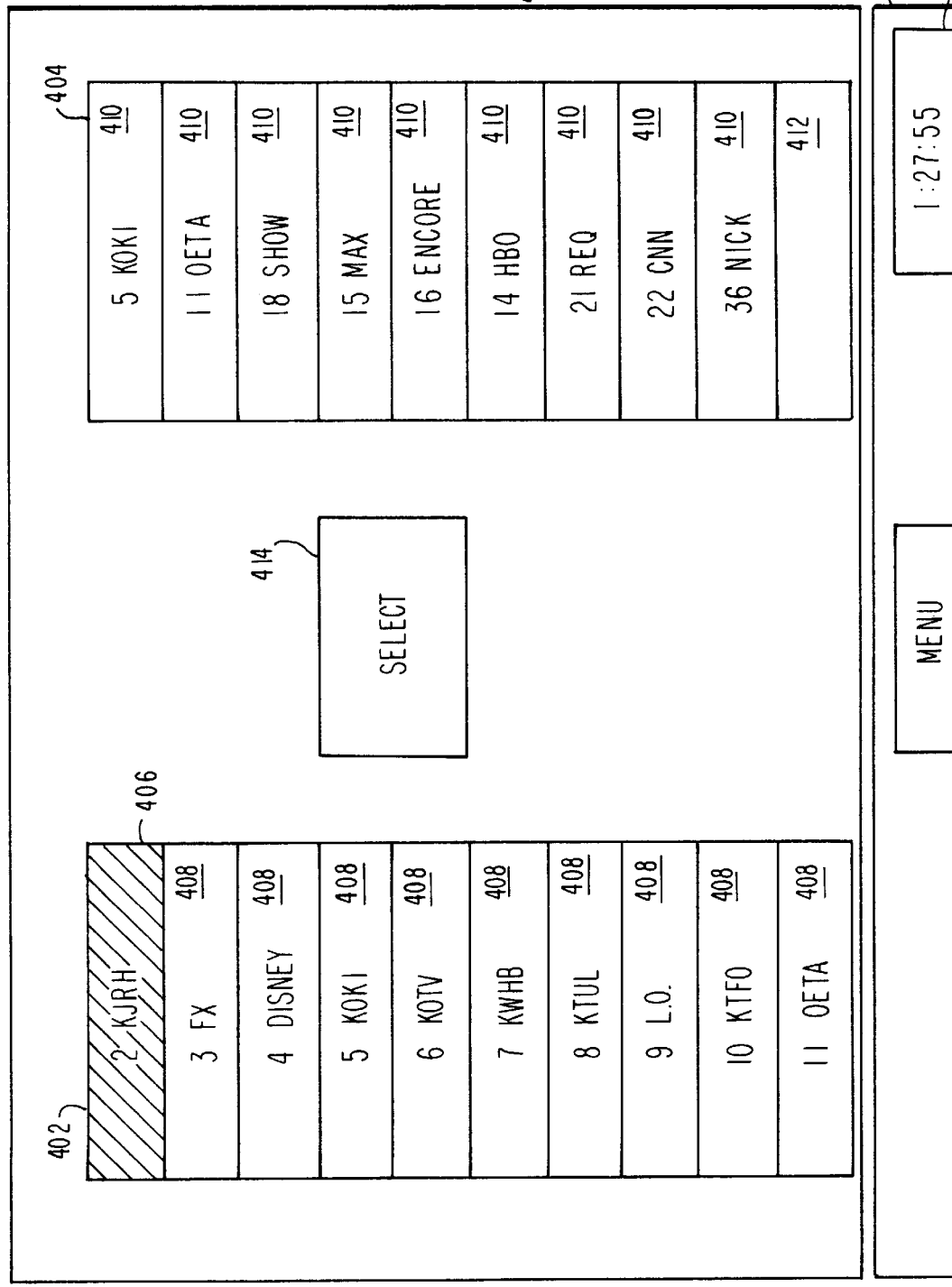

Referring now to FIG. 9, a favorite channel screen 400 is described. The favorite channel screen 400 appears on the display 84 (FIG. 2) when the viewer selects the Favorite Channel display mode from the quickmenu 116 (FIG. 3). The Favorite Channel display mode allows the viewer to select a favorite channel line-up, which is used to sort the channels displayed in the Program Guide display mode. By selecting a favorite channel line-up, the viewer can sort the program schedule information displayed in the Program Guide display mode, so that the channels that the viewer is most interested in appear first, in the order selected by the viewer. Program schedule information for the other channels follow thereafter. The selected favorite channel line-up is preferably operative only in the Program Guide display mode (FIGS. 3–6). It preferably has no effect on the Program Search display mode (FIG. 7). In addition, the favorite channel line-up is preferably not applied to the premium channel line-up.

Like the screens 100, 200 and 300, the screen 400 includes the title bar 124 with the clock cell 126. The quickmenu 116 (FIG. 3) is also available.

The screen 400 also includes two menus—a full channel line-up menu 402 and a favorite channel line-up menu 404. The menu 402 presents a list of the channels provided by the headend telecasting center 54 (FIG. 1). The menu 402 contains a plurality of cells 406 and 408, each displaying a channel number and call sign for one of the available channels. The cell 406 is shown highlighted to represent the location of a cursor. The Up and Down Arrow keys are used to move the cursor from one cell to the next. The menu 402 displays a subset of the available channels, but the viewer can scroll the menu 402 to consider other channels in the full channel line-up. The menu 402 preferably operates in an endless loop fashion.

The menu 404 also contains a plurality of cells 410 for displaying channel numbers and call signs corresponding to the viewer's favorite channel line-up When the Favorite Channel display mode is invoked, the viewer's previously selected favorite channel line-up is retrieved from the memory 76 (FIG. 2). In the example shown in FIG. 9, the viewer's favorite channel line-up includes the nine channels shown in the cells 410. An unused cell 412 is left empty. If the viewer had not previously established a favorite channel line-up, the menu 404 would consist of an array of empty cells 412. If the viewer's favorite channel line-up includes more channels then can be displayed at once, the menu 404 can be scrolled (like the menu 402) to display additional channels. To scroll the menu 404, the viewer first moves the cursor to the menu 404 by using the Left or Right Arrow key.

The screen 400 also includes a select icon 414. The cursor can be placed on the select icon 414 by using the Left or Right Arrow key. When the Select key on the remote control 78 (FIG. 2) is pressed while the select icon 414 is highlighted, the favorite channel line-up in the menu 404 is stored in the memory 76 (FIG. 2), and the interactive program guide returns to the Program Guide display mode (FIGS. 3–6). The program schedule information is then presented in accordance with the viewer's stored favorite channel line-up.

The viewer establishes a favorite channel line-up by selecting channels from the menu 402 and inserting the selected channels into desired locations in the menu 404. For example, in order to insert the channel indicated in the cell 406 (i.e., channel 2) into the favorite channel line-up, the viewer presses the Select key while the cursor is on the cell 406. The cursor then automatically jumps to the first empty cell in the menu 404, which is the cell 412 in the example shown in FIG. 9. The channel number and call sign are also displayed in the cell 412 (not shown in FIG. 9). The viewer then presses the Select key to temporarily insert the selected channel at the highlighted location (e.g., the cell 412). It should be noted that the favorite channel line-up need not be assembled in numerical order. The channel sequence defined by the viewer in the screen 400 is used to present schedule information in the Program Guide display mode (FIGS. 3–6).

In order to remove channels from the favorite channel line-up, the viewer moves the cursor to the menu 404 without selecting a channel from the menu 402. The viewer can then move the cursor to any cell containing a channel identification (e.g., any one of the cells 410). Pressing the Select key while one of the cells 410 is highlighted causes a prompt (not shown) to be displayed requesting confirmation of the deletion. The deletion can be confirmed by pressing the Select key. When the Select key is pressed, the channel appearing in the highlighted cell is erased. The emptied cell may be later filled with another channel, or it may be left empty, thereby reducing the size of the favorite channel line-up.

When the viewer is satisfied with the favorite channel line-up, the Left or Right Arrow key may be used to move the cursor to the select icon 414. By then pressing the Select key, the favorite channel line-up is stored and applied, as described above. In order to exit the screen 400 without saving the changes, the quickmenu 116 (FIG. 3) may be invoked.

Once a favorite channel line-up has been stored in the memory 76 (FIG. 2), it is automatically applied to the program schedule information each time the interactive program guide is invoked. In an alternative embodiment, the interactive program guide allows for creation and storage of several different favorite channel line-ups (e.g., one for each member of a household). To accomplish this, the interactive program guide requests a personal identification number (not shown) each time the guide is invoked. The personal identification number is used to uniquely identify each favorite channel line-up.

It may also be desirable to allow the viewer to disable the favorite channel line-up. This may be accomplished by including a context sensitive menu choice in the quickmenu 116 (FIG. 3) labeled "Disable" (not shown). Selecting Disable prevents the application of the favorite channel line-up for the current session, or until the viewer returns to the screen 400 to select a context sensitive "Enable" menu choice (not shown) from the quickmenu 116 (FIG. 3).

Figure 10:
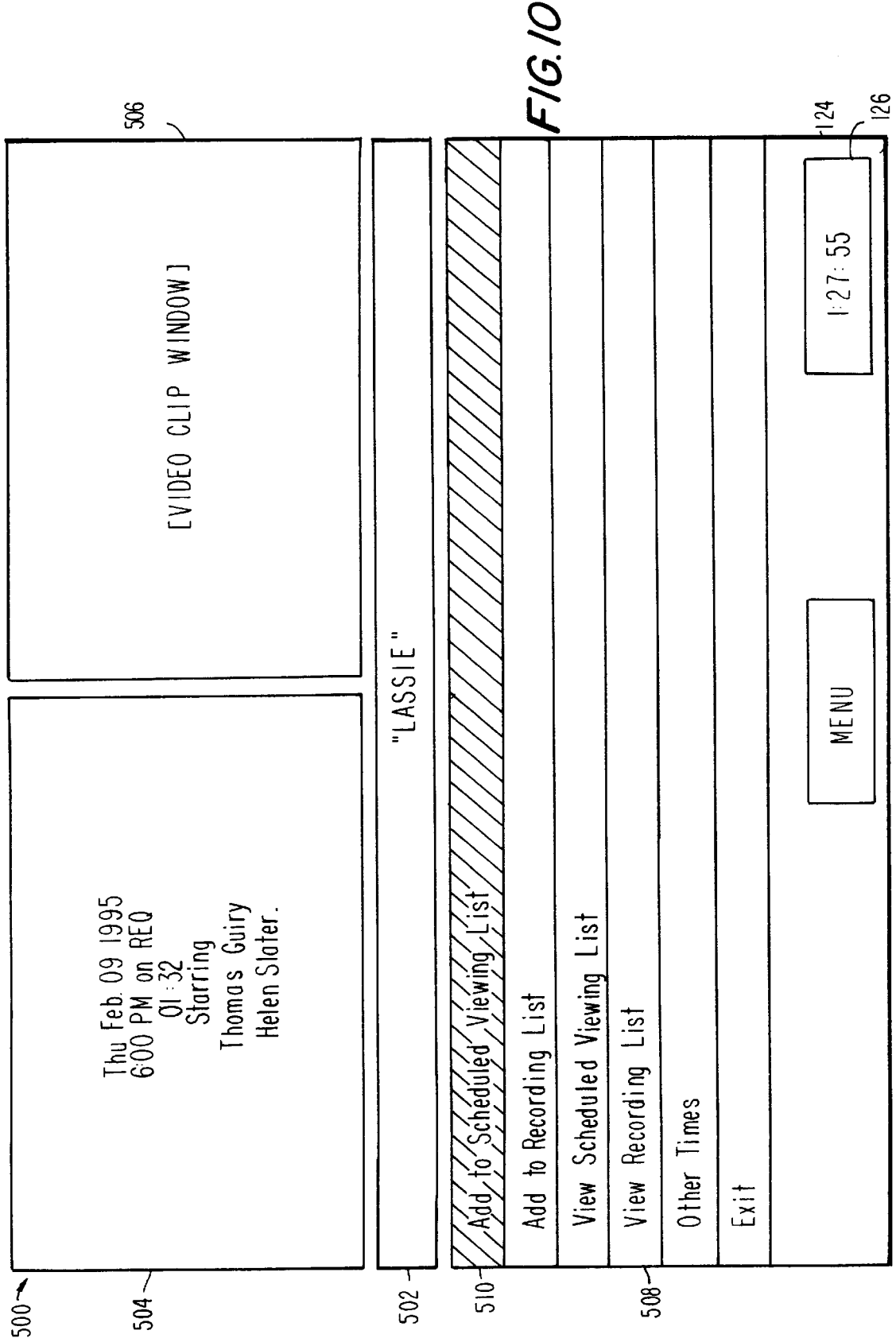

Turning now to FIG. 10, a program selection screen 500 is described. The program selection screen appears on the display 84 (FIG. 2) when the viewer selects a program from either the screen 100 in the Program Guide display mode (FIGS. 3–6) or the screen 200 in the Program Search display mode (FIG. 7). The program selection screen 500 is also displayed when the viewer selects the menu choice "Player" (not shown) from the quickmenu 116 (FIG. 3). As shown in FIG. 10, the screen 500 includes the title bar 124 with the clock cell 126. The quickmenu 116 (FIG. 3) can be invoked from the screen 500 by pressing the Menu key on the remote control 78 (FIG. 2).

The screen 500 further includes a program title window 502, a description window 504, a video clip window 506, and a menu window 508. When the screen 500 is invoked by selecting a program from either the screen 100 (FIGS. 3–6) or the screen 200 (FIG. 7), the program title window 502 displays the title of the selected program. In addition, the description window 504 displays more information which may be included in the program schedule information stored in the memory 76 (FIG. 2) for the selected program. Such information may include the telecast date and time, the channel, featured performers, MPAA rating, etc.

The video clip window 506 is used to display a short video clip relating to the selected program (if a video clip is included in the program schedule information for the selected program). This feature is described in commonly assigned, copending U.S. patent application Ser. No. 08/246, 949 entitled "Video Clip Program Guide," which is hereby incorporated by reference in its entirety.

When the screen 500 is invoked from the quickmenu 116 (FIG. 3), the windows 502, 504, and 506 are empty.

The choices presented in the menu window 508 also depend on the circumstances under which the screen 500 is invoked. The choices shown in FIG. 10 are presented when the viewer selects, from the screen 100 (FIGS. 3–6) or the screen 200 (FIG. 7), a program that is not currently being telecast. A choice 510 is shown highlighted to represent the location of a cursor. The Up and Down Arrow keys may be used to move the cursor from one choice to the next. The Select key is used to select a menu choice.

The menu choice "Add to Scheduled Viewing List" is used to add an entry for the selected program into the scheduled viewing list. When the current time approaches or matches the telecast time for a program listed in the scheduled viewing list, the display 84 (FIG. 2) displays a prompt (not shown) notifying the viewer that a program of interest is about to start. The prompt is displayed (as long as the display 84 is on) even if the interactive program guide is not active. The viewer can clear the prompt by pressing any navigation key on the remote control 78 (FIG. 2).

The menu choice "Add to Recording List" is used to add an entry for the selected program into a recording list. When the current time approaches or matches the telecast time for a program listed in the Recording List, the control unit 74 (FIG. 2) causes the tuning circuitry 72 (FIG. 2) to tune to the appropriate channel. Through the IR transmitter 90 (FIG. 2), the control unit 74 (FIG. 2) also causes the VCR 88 (FIG. 2) to begin recording at the appropriate time (assuming that the VCR 88 (FIG. 2) had been turned on by the viewer beforehand).

The menu choice "View Scheduled Viewing List" is used to invoke a display (not shown) listing program schedule information for programs that have been added to the scheduled viewing list. The menu choice "View Recording List" operates similarly with respect to the recording list. Preferably, the displayed information (not shown) includes the title, telecast time, and channel for each program. The navigation keys on the remote control 78 (FIG. 2) may be used to clear either of the displayed lists.

The menu selection "Other Times" is used to display a list of telecast times (not shown) other than the selected time, for the selected program.

To exit the screen 500 and return to the screen from which it was invoked, the user selects the "Exit" menu choice. Alternatively, the quickmenu 116 (FIG. 3) may be used to exit the screen 500.

If the screen 500 is invoked by selecting a program currently being telecast, the menu choices "Add to Scheduled Viewing List" and "Add to Recording List" are not displayed. Instead, the first menu choice preferably displayed is "Tune to Program." When "Tune to Program" is selected, the control unit 74 (FIG. 2) causes the tuning circuitry 72 (FIG. 2) to tune to the selected program. The selected program is then presented on the display 84 (FIG. 2).

When the screen 500 is invoked from the quickmenu 116 (FIG. 3), only the "View Scheduled Viewing List," "View Recording List" and "Exit" menu choices are available.

The present invention also contemplates the use of additional menu choices that would be appropriate in a duplex cable network (i.e., one that allows two-way communication between the set-top box 70 (FIG. 2) and the headend telecasting center 54 (FIG. 1)). For example, in such a system, when the viewer invokes the screen 500 by selecting a pay per view program from either the screen 100 (FIGS. 3–6) or the screen 200 (FIG. 7), the menu choices may include an "Order Pay Per View" choice. If the viewer selects that choice, the set-top box 70 (FIG. 2) transmits the request to the headend telecasting center 54.

The program schedule information stored in the memory 76 (FIG. 2) may also be used to provide an abbreviated program guide that allows the viewer to browse through the program schedule information while simultaneously watching a television program on the display 84 (FIG. 2). In order to implement the abbreviated guide, the remote control 78 (FIG. 2) preferably includes an additional key (labeled, e.g., "Browse") to invoke the abbreviated guide. The abbreviated guide is preferably displayed as an overlay on the television program being watched when the Browse key is pressed. The abbreviated guide is preferably displayed on the lower portion of the display 84 (FIG. 2) so as to not be unduly distracting.

The abbreviated guide provided in accordance with the present invention may be understood by reference to FIGS. 30–33. A display 550 depicts the abbreviated guide as it may appear when it is first invoked. As shown in FIG. 30, when the abbreviated guide is invoked, it does not display program schedule information. Instead, the display 550 simply presents the title of the program that is currently being shown on the display 84 (FIG. 2). The channel number (not shown) may also be displayed, but preferably in the upper left hand corner of the display 84 (FIG. 2). The channel number preferably remains displayed for about five seconds, or until the viewer presses any navigation key on the remote control 78 (FIG. 2). Thus, with a single press of the Browse key, the viewer is provided with an immediate and unobscured display of the channel and title of the program being shown on the display 84 (FIG. 2).

The display 550 is shown highlighted, indicating the presence of a cursor that the viewer can control using the navigation keys. If the viewer presses the Right Arrow key from the display 550, the channel number in the upper left corner of the display 84 (FIG. 2) immediately disappears. In addition, a display 556 appears in place of the display 550. The display 556 still does not present program schedule information (i.e., no channel is displayed). Rather, the display 556 includes a time bar 558 preferably containing four time cells 560 each representing a one half hour period of programming. The display 556 also includes a single-line program grid 562 containing, in this example, a plurality of program cells 564, 566, 568, and 570. Like the program cells of the program grid 112 (FIGS. 3–6), the widths of the program cells 564, 566, 568, and 570 vary in accordance with the lengths of the programs identified in the program cells. Thus, a program cell for a two hour program would span the entire width of the program grid 562.

By pressing the Right Arrow key from the display 550, the viewer moves the cursor to the program cell 566. Further presses of the Right Arrow key cause the cursor to continue to move to the right until the program cell 570 is reached, at which point the program grid 562 and the time bar 558 scroll with continued Right Arrow key presses in order to display additional program titles for later time periods. The program grid 562 and time bar 558 also scroll to the left in response to Left Arrow key presses, as needed, preferably up to the current time period (i.e., the program cell 564). However, when the program cell 564 is reached, the abbreviated guide preferably resumes the display 550 for the program currently being shown on the display 84 (FIG. 2). This presentation provides the viewer with immediate feedback that he or she has navigated back to the program title corresponding to the program being watched. When the display 550 is redisplayed in this manner, the channel is preferably displayed again in the upper left corner of the display 84 (FIG. 2) for about five seconds or until the next navigation key is pressed.

If the viewer presses the Down Arrow key from the display 550, a display 551 is presented in place of the display 550. The display 551 still does not present program schedule information (i.e., telecast times are not provided). The display 551 includes a single channel cell 552 containing a channel number and call sign, and a single program cell 554 containing the title of the program that is currently being telecast on the channel indicated by the channel cell 552. Each time the viewer presses the Down Arrow key, the contents of the channel cell 552 and the program cell 554 are replaced with the appropriate information for the next channel in the sequence of available channels. The viewer can use the Up Arrow key to move back through the channels until the current channel is reached, at which time the display 551 is replaced with the display 550.

Once the viewer navigates in a dogleg fashion (i.e., by moving the cursor away from both the current time period and the current channel), it becomes desirable to display program schedule information (i.e., telecast time, channel and title), as shown in a display 572. The display 572 includes a channel cell 574, a date cell 576, a time bar 578 spanning one and a half hours, and a program grid 580. The viewer can navigate in the program grid 580 in substantially the same manner as described above for the program grid 112 (FIGS. 3–6)—the main difference being that program schedule information for only one channel is displayed at any given time.

The Select key on the remote control 78 (FIG. 2) is preferably operative in the abbreviated guide to cause the tuning circuitry 72 (FIG. 2) to tune to the highlighted program, if the program is currently being telecast. Otherwise, the Select key has no effect. In an alternative embodiment, the Select key may instead be used to invoke the player screen 500 (FIG. 10) to allow the viewer to schedule the highlighted program for later viewing or recording.

The abbreviated guide preferably remains on the display 84 (FIG. 2) for a predetermined period of time following the last key press on the remote control 78 (FIG. 2) (preferably about five seconds), after which it is automatically cleared.

Referring now to FIGS. 11–28, a series of logic flow diagrams are described which represent at a functional level, a control program executed by the control unit 74 (FIG. 2) for implementing the interactive program guide of the present invention.

A main program loop 600 is described in connection with FIG. 11. Although the main program loop 600 is represented as a conventional top-down flowchart, it is preferably implemented as a collection of interrupt-driven routines which perform the stated functions. The program begins with test 602 where the control unit 74 (FIG. 2) determines if program schedule information and/or software (including operational parameters) which are not currently stored in the memory 76 (FIG. 2) are being received from the headend telecasting center 54 (FIG. 1). If such data or software is being received, the control unit 74 (FIG. 2) stores the received data in the memory 76 (FIG. 2) at step 604. Otherwise, the control unit 74 (FIG. 2) performs test 606 to determine if the current time is approaching a program telecast time stored in either the scheduled viewing list or the recording list in memory 76 (FIG. 2).

If the current time is approaching a stored telecast time, the control unit (FIG. 2) then determines at test 608 which list the telecast time is stored in. If the telecast time is stored in the scheduled viewing list, the control unit 74 (FIG. 2) causes the display 84 (FIG. 2) to display a prompt (as long as the display 84 is turned on) notifying the viewer that a scheduled program is about to be telecast. In an alternative embodiment, the control unit 74 (FIG. 2) may cause the display 84 (FIG. 2) to display several prompts prior to the scheduled telecast time (e.g., one each minute for the three minutes preceding the scheduled telecast time). Of course, other prompt schedules may be used as deemed appropriate. After the last prompt is displayed, the control unit 74 (FIG. 2) deletes the entry for the scheduled program from either the scheduled program list or the recording list at step 612.

If it is determined at test 608 that the telecast time is stored in the recording list, the control unit 74 (FIG. 2) proceeds to step 614, where it causes the tuning circuitry 72 (FIG. 2) to tune to the channel on which the scheduled program is being transmitted. Then at step 616, the control unit 74 (FIG. 2) then causes the VCR 88 (FIG. 2) to begin recording at the stored telecast time. The control unit 74 (FIG. 2) then deletes the entry for the scheduled program at step 612.

After step 612, or if the control unit 74 (FIG. 2) determines at test 606 that the current time is not approaching a stored telecast time, a test 618 is performed to determine if the viewer has pressed the Guide key on the remote control 78 (FIG. 2). If not, the control unit 74 (FIG. 2) loops back to the test 602. If the Guide key has been pressed, the control unit 74 (FIG. 2) then determines if the interactive program guide is currently active at test 620. If it is, the control unit 74 (FIG. 2) deactivates the guide at step 622. If not, a navigation point is set to "Hot Picks" at step 624, and a Program Guide routine (described below in connection with FIGS. 12–13) is then invoked at step 626. The control unit 74 (FIG. 2) loops back to test 602 after either step 622 or 626 is performed.

Figure 11:
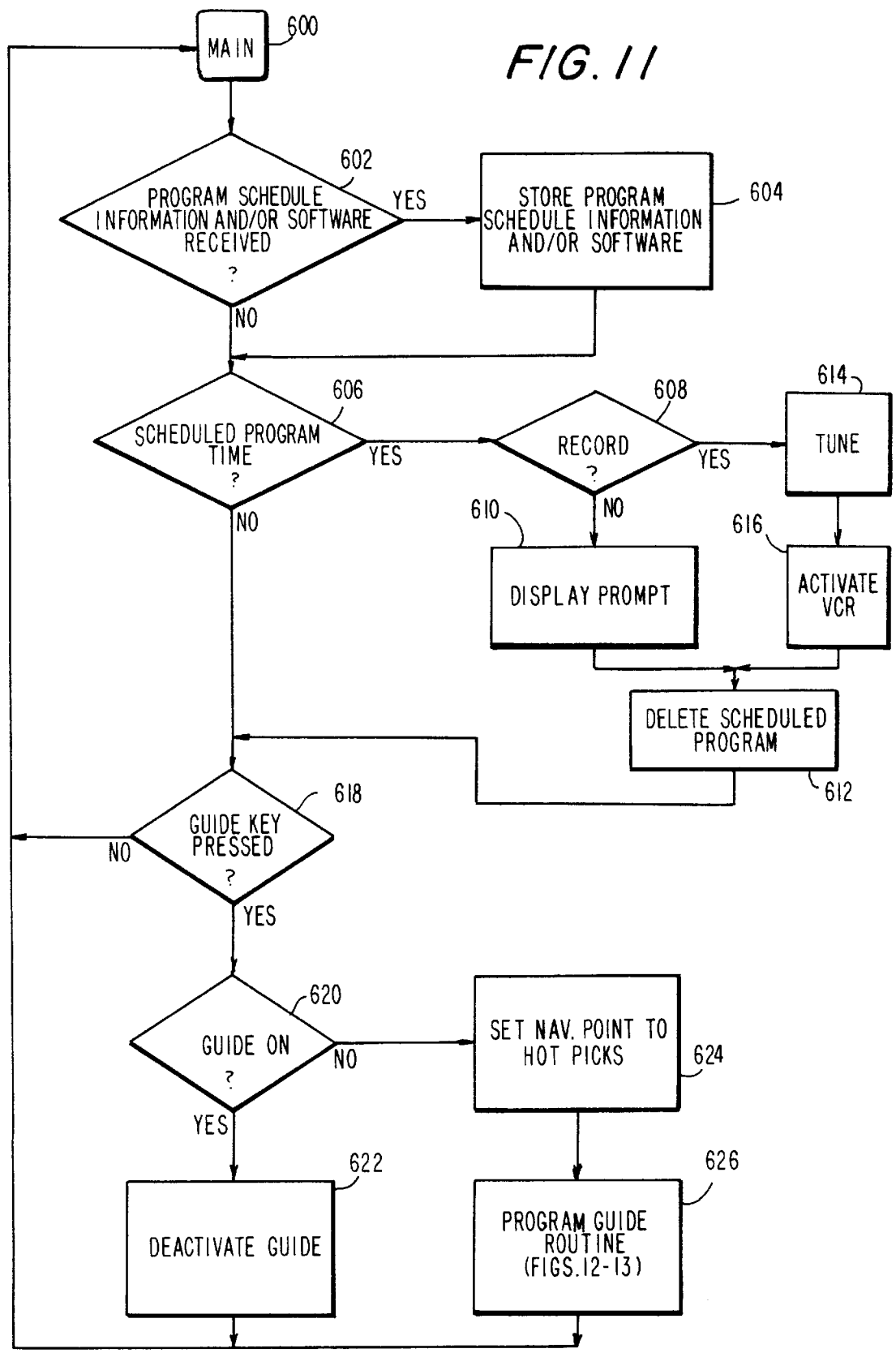
FIGS. 11–28 are logic flow diagrams representing, at a functional level, a control program used to implement the interactive program guide of the present invention.

As mentioned above, the functions described with respect to FIG. 11 are preferably implemented through the use of interrupt-driven routines. Thus, the control unit 74 (FIG. 2) is preferably responsive to the scheduled viewing list, the recording list, and Guide key presses while the interactive program guide is operating in any of the previously described display modes.

Figure 12:
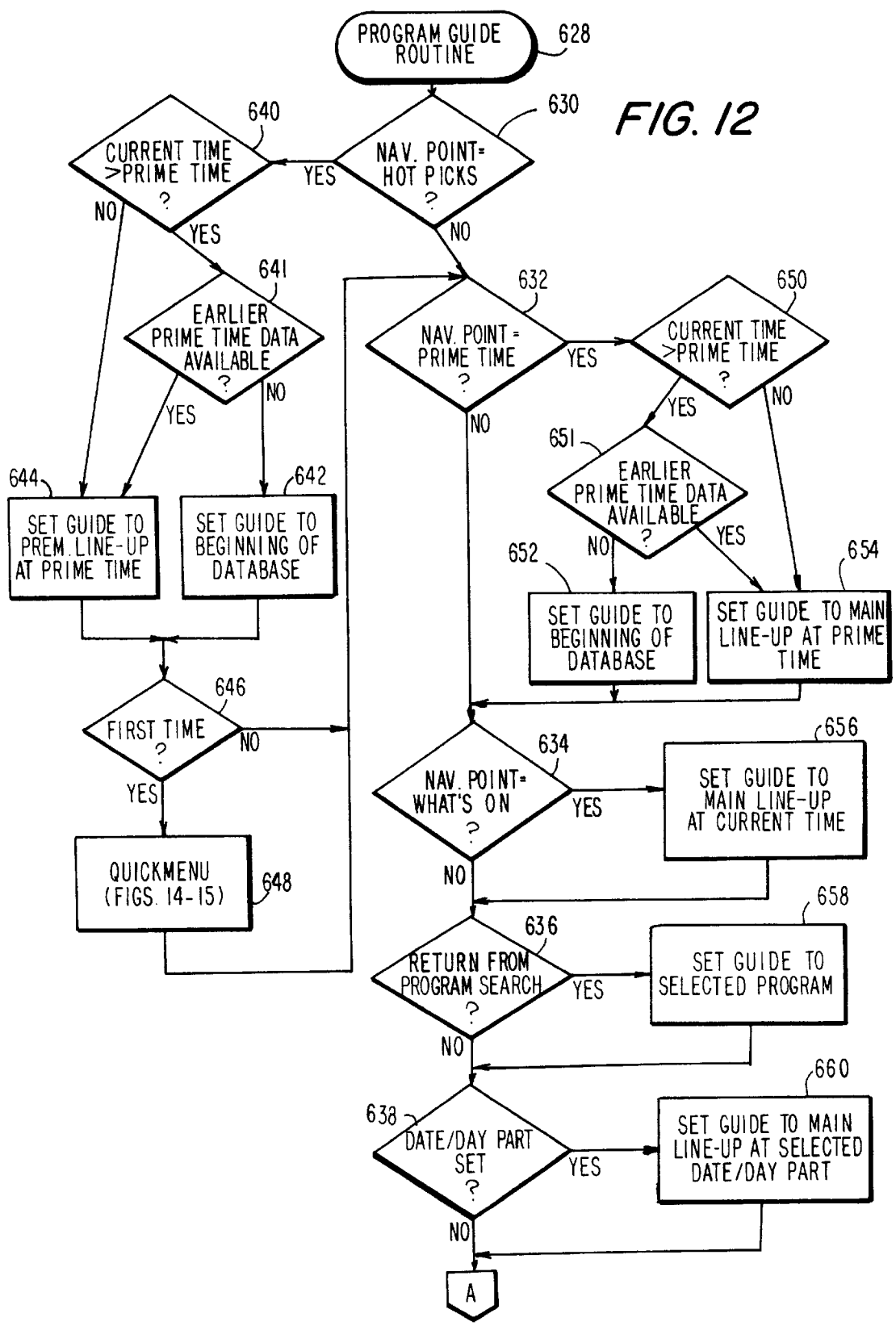
Figure 13:
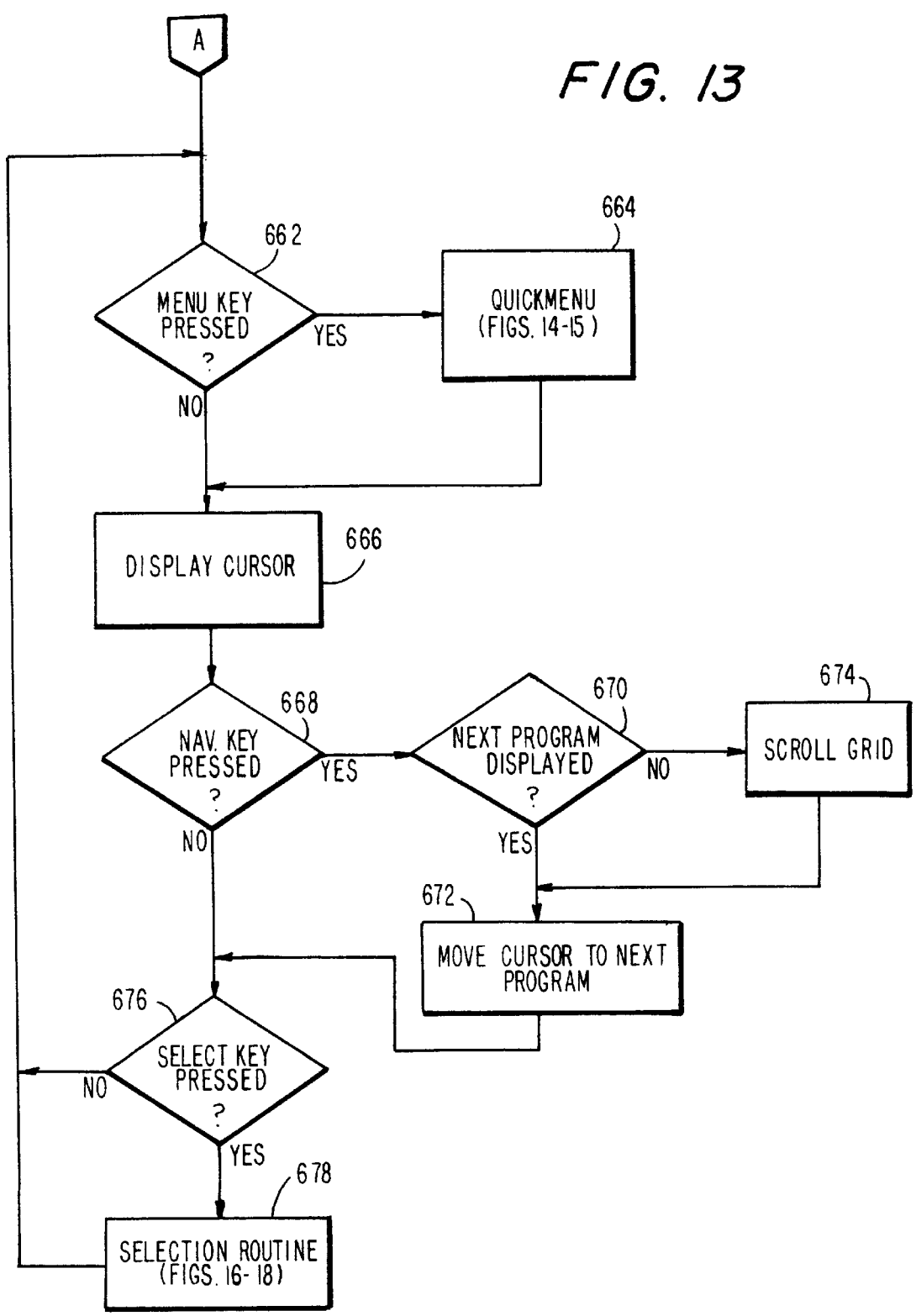

FIGS. 12–13 represent the Program Guide routine 628, which is performed by the control unit 74 (FIG. 2) in order to provide the Program Guide display mode (FIGS. 3–6). After the Program Guide routine 628 is invoked, a series of tests 630, 632, 634, 636, and 638 are performed to determine how the control unit 74 (FIG. 2) will present program schedule information in the program guide screen 100 (FIGS. 3–6).

If it is determined at test 630 that the Hot Picks navigation point is set, the control unit 74 (FIG. 2) then determines at test 640 whether the current time period is later than the starting prime time stored in the memory 76 (FIG. 2). If it is, test 641 is performed to determine if earlier prime time data are still available for display. If earlier data are not available (because such data were discarded), the control unit 74 (FIG. 2) at step 642 causes the display 84 (FIG. 2) to display the premium channel line-up in the screen 100 (FIGS. 3–6) starting at the beginning of the database, or alternatively, at the beginning of tomorrow's prime time. If the current time period is not later than the starting prime time hour (test 640), or if earlier prime time data is available (test 641), the control unit 74 (FIG. 2), at step 644, causes the display 84 (FIG. 2) to display the premium channel line-up starting at the prescribed prime time hour (e.g., 7:00 PM) in the screen 100 (FIGS. 3–6). After either step 642 or 644, test 646 is performed to determine if the current execution of the Program Guide routine 628 is the first execution since the Guide key was pressed. If it is, the Quickmenu (described below in connection with FIGS. 14–15) is invoked at step 648. If not, or after step 648 is completed, the control unit 74 (FIG. 2) proceeds to test 632.

If it is determined at test 632 that the Prime Time navigation point is set, the control unit 74 (FIG. 2) then determines at test 650 whether the current time period is later than the starting prime time stored in the memory 76 (FIG. 2). If it is, test 651 is performed to determine if earlier prime time data is still available for display. If earlier data is not available (because such data were discarded), the control unit 74 (FIG. 2), at step 652, causes the display 84 (FIG. 2) to display the main channel line-up in the screen 100 (FIGS. 3–6) starting at the beginning of the database, or alternatively, at the beginning of tomorrow's prime time. If the current time period is not later than the starting prime time hour (test 650), or if earlier prime time data is available (test 651), the control unit 74 (FIG. 2), at step 654 causes the display 84 (FIG. 2) to display the main channel line-up (which may be sorted in accordance with the viewer's favorite channel selections) starting at the prescribed prime time hour (e.g., 7:00 pm) in the screen 100 (FIGS. 3–6). After either step 652 or 654, the control unit 74 (FIG. 2) proceeds to test 634.

At test 634, the control unit (FIG. 2) determines if the What's On navigation point is set. If it is, at step 656, the control unit 74 (FIG. 2) causes the display 84 (FIG. 2) to display the main channel line-up (which may be sorted in accordance with the viewer's favorite channel selections) starting at the current time period in the screen 100 (FIGS. 3–6). After step 656, the control unit (FIG. 2) proceeds to test 636. Alternatively, the system may be programmed to display the main channel line-up starting at the time period following the current time period, or at some other time not including a current time period.

Figure 19:
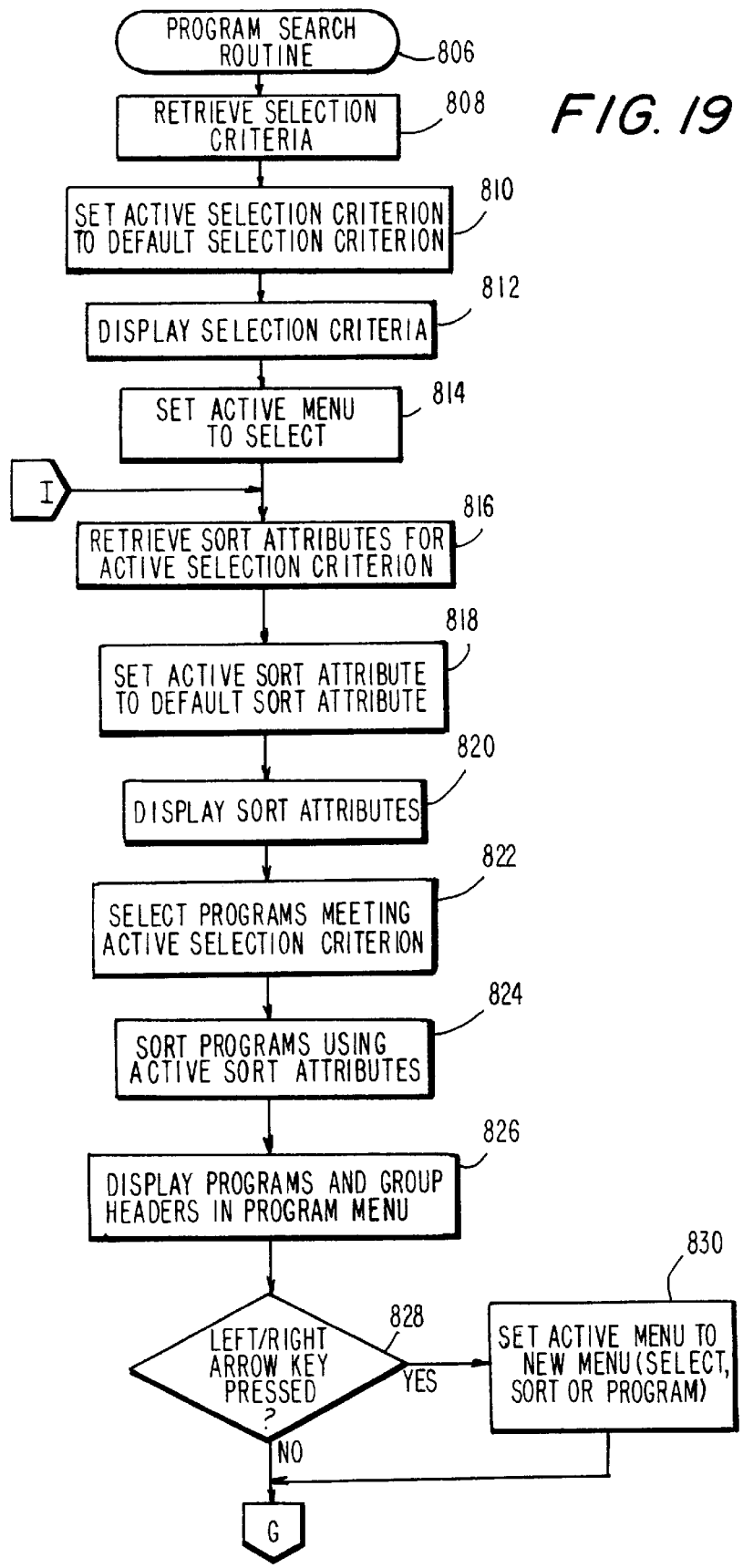
Figure 20:
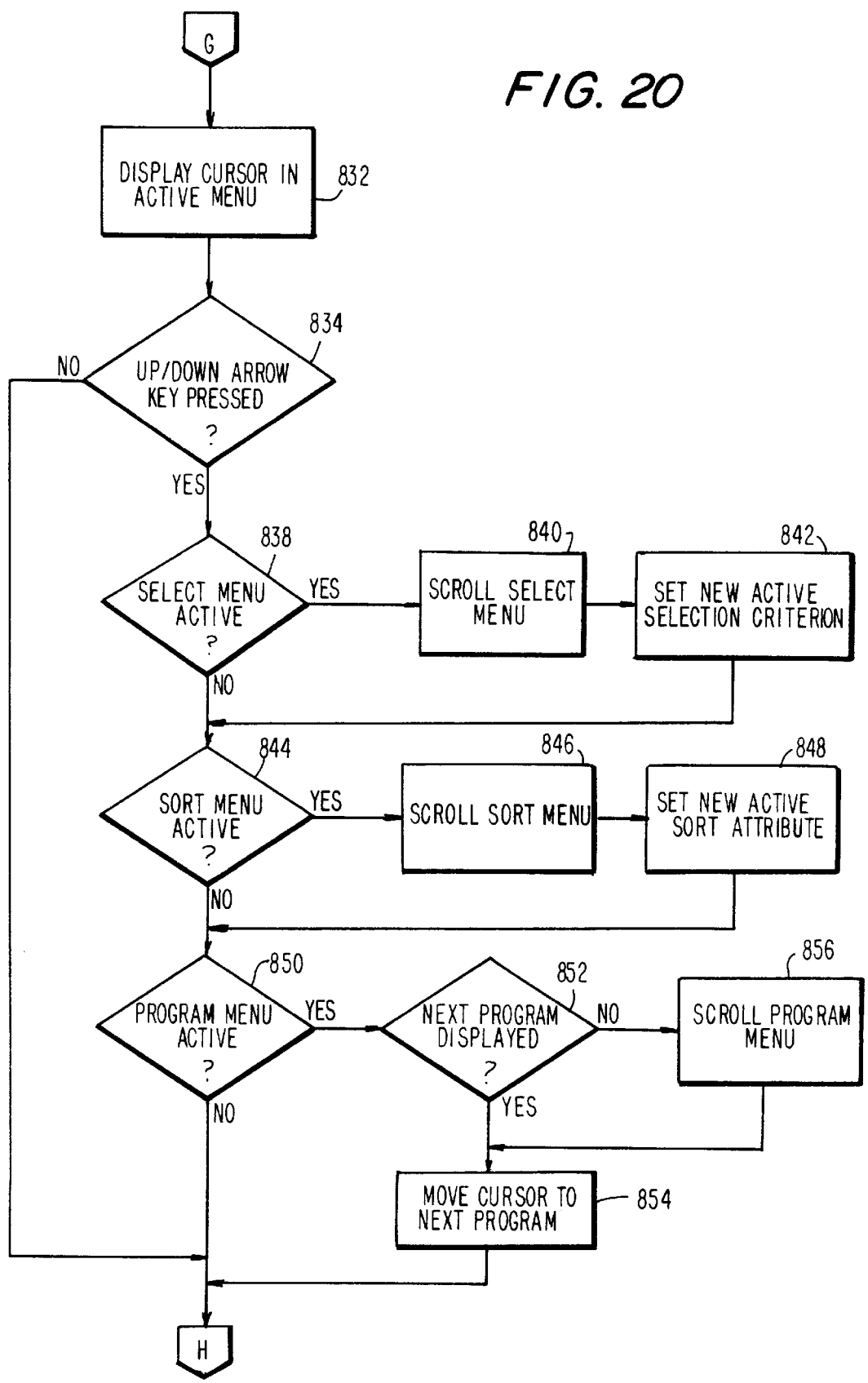
Figure 21:
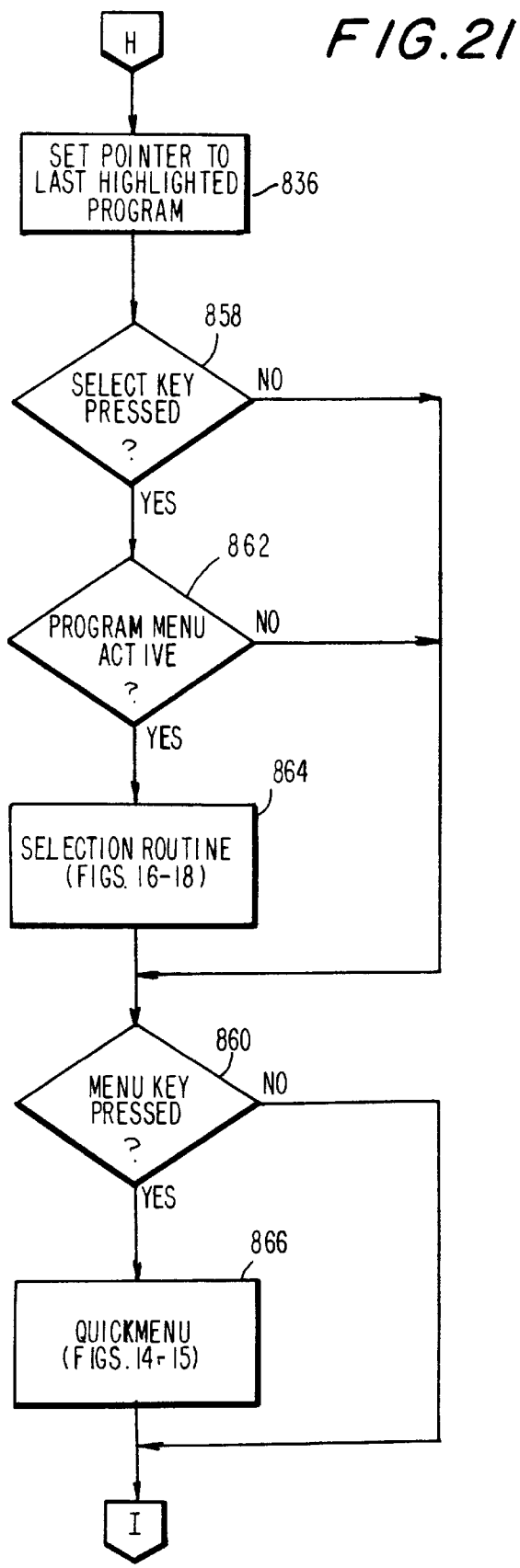

At test 636, the control unit (FIG. 2) determines if the Program Guide routine was invoked from the Program Search display mode (described below in connection with FIGS. 19–21). If it was, at step 658, the control unit 74 (FIG. 2) causes the display 84 (FIG. 2) to display program schedule information in the screen 100 (FIGS. 3–6), starting with the program referenced by a pointer set in the Program Search routine (FIGS. 19–21). After step 658, the control unit (FIG. 2) proceeds to test 638.

Figure 22:
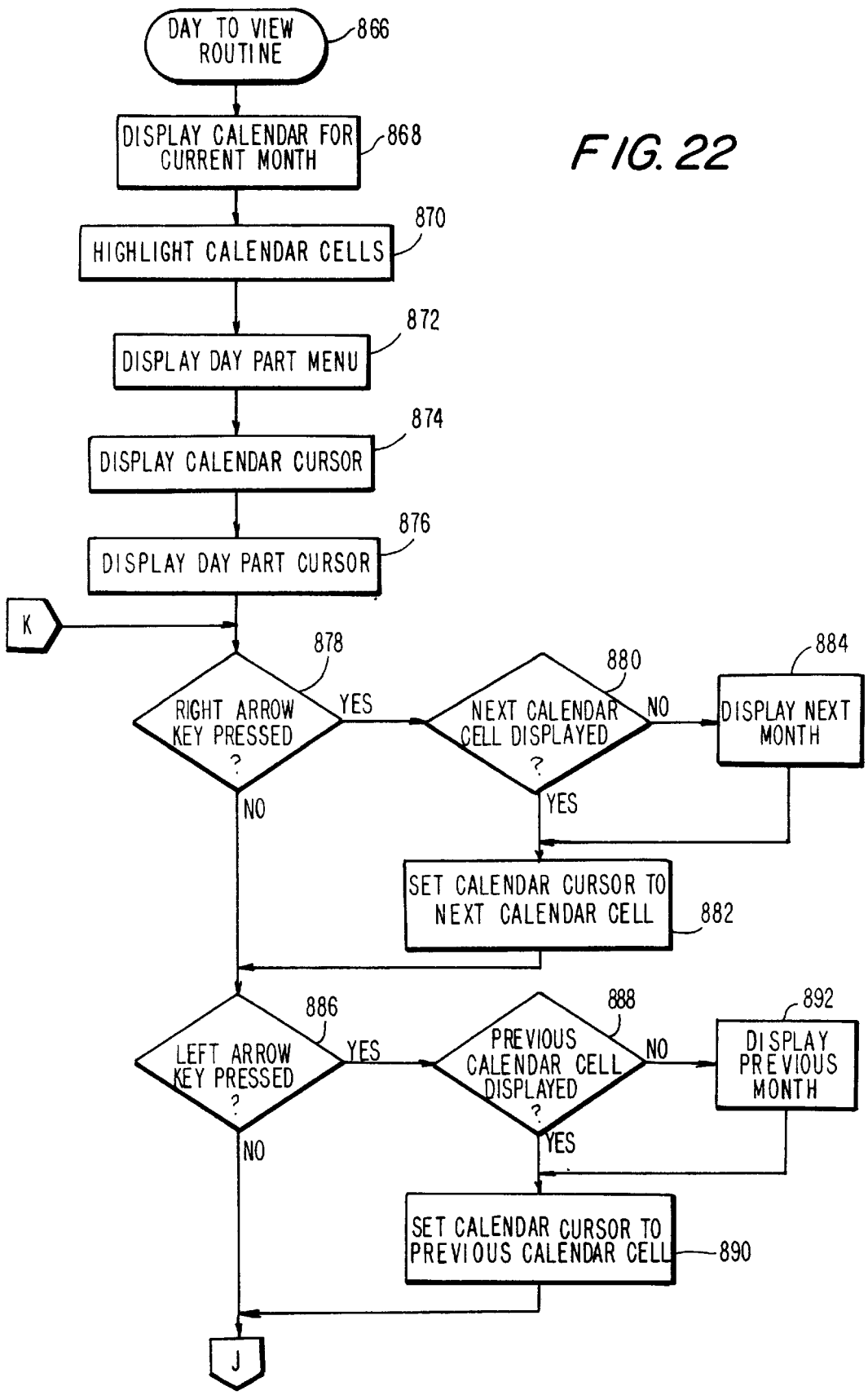
Figure 23:
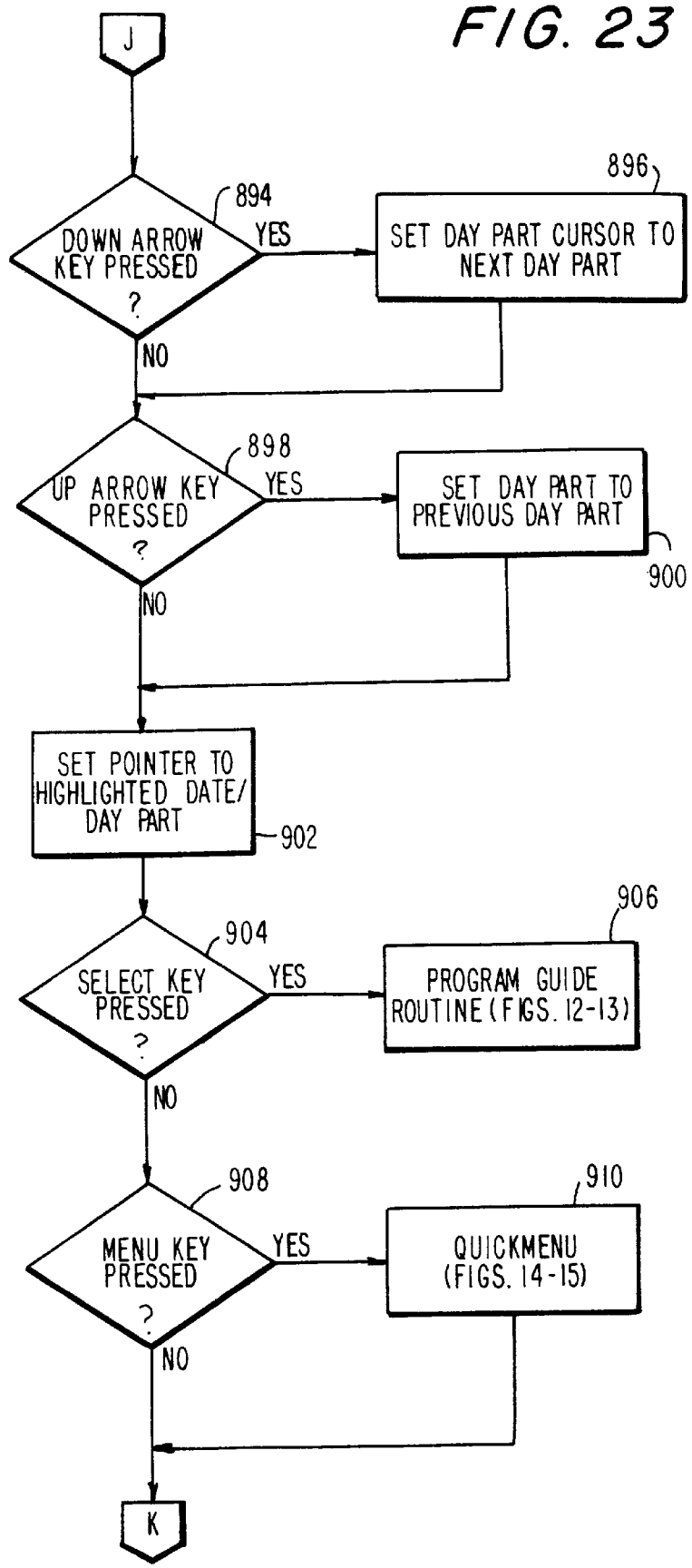
Figure 24:
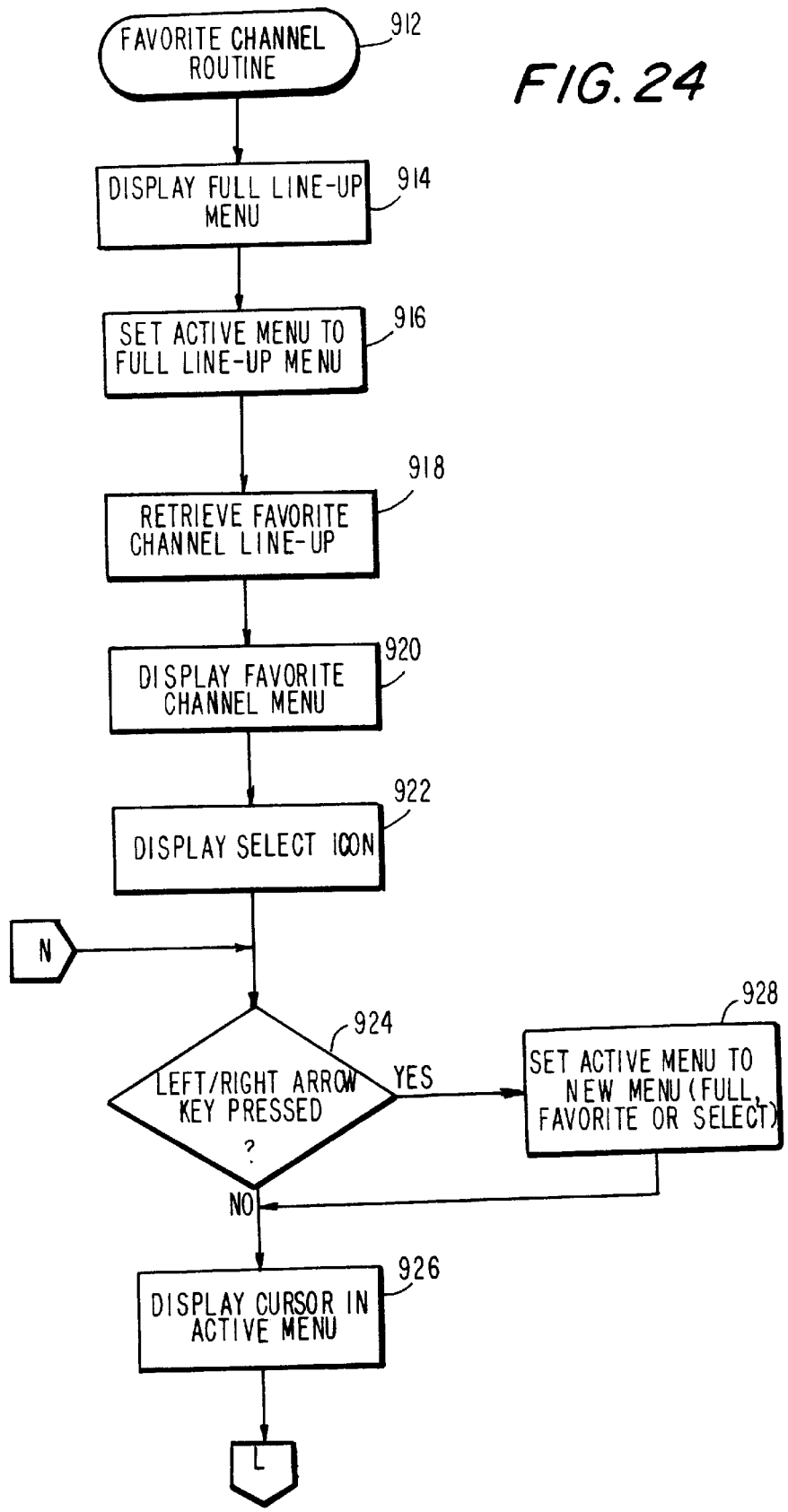
Figure 25:
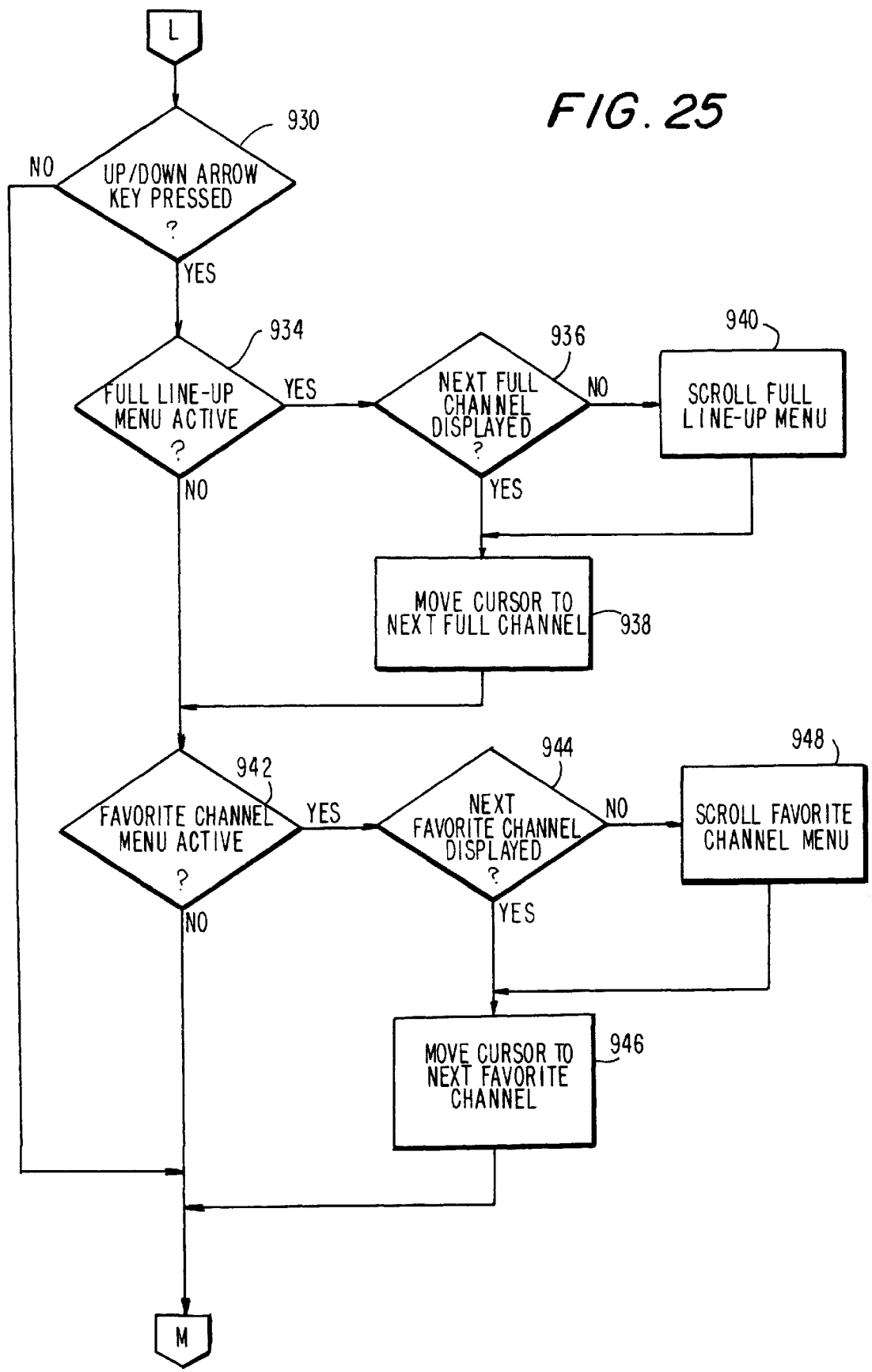
Figure 26:
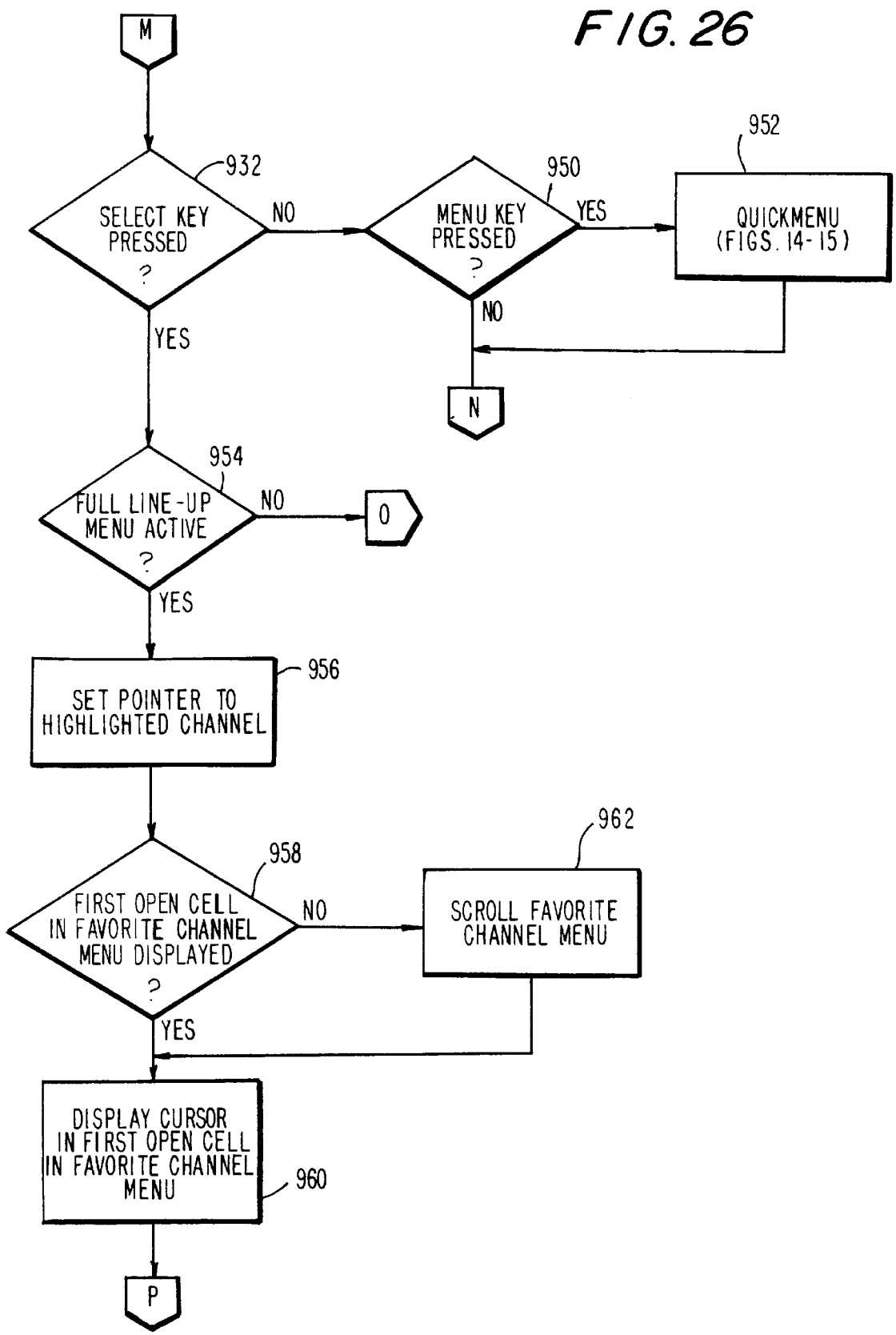
Figure 27:
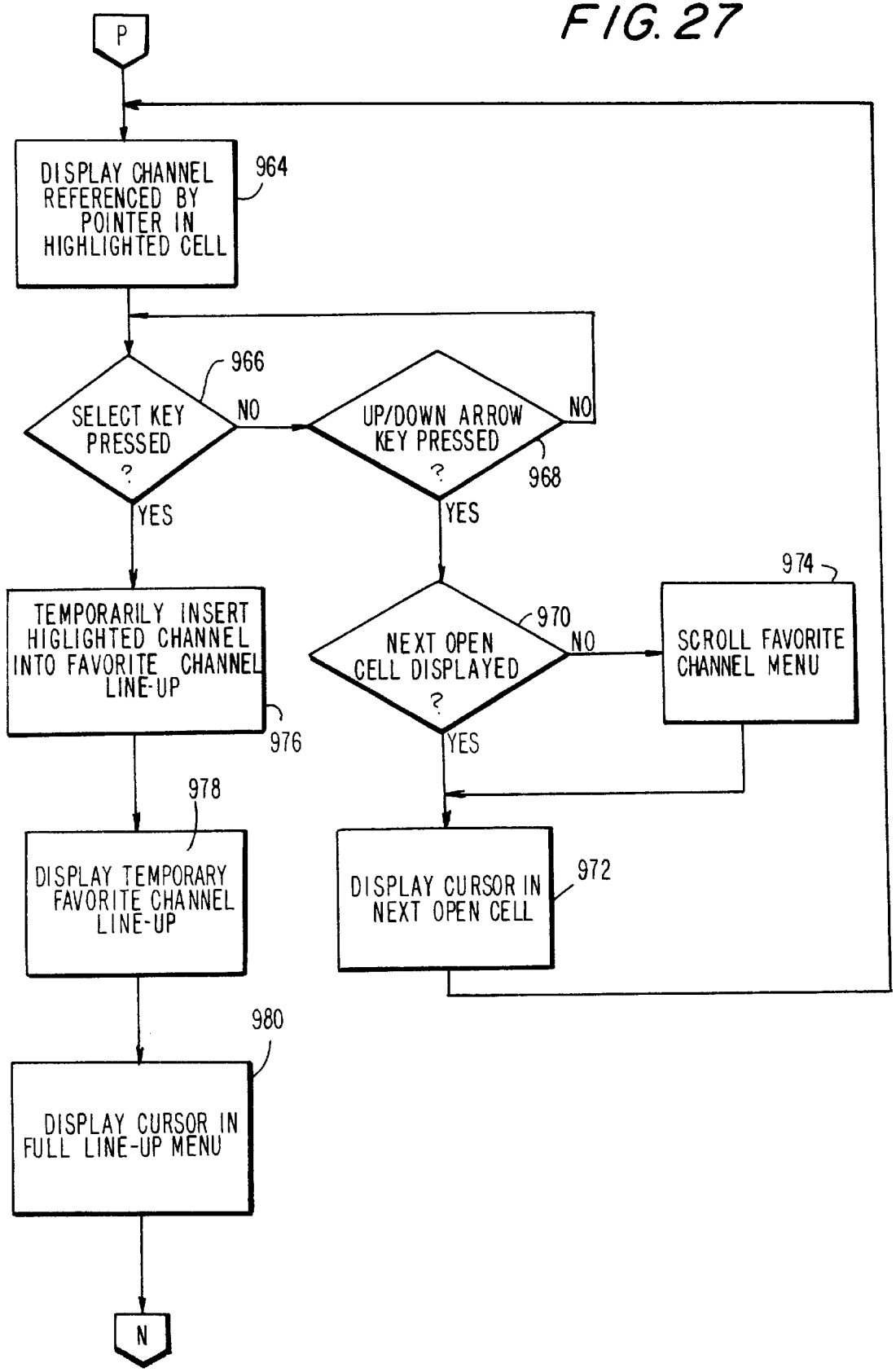
Figure 28:
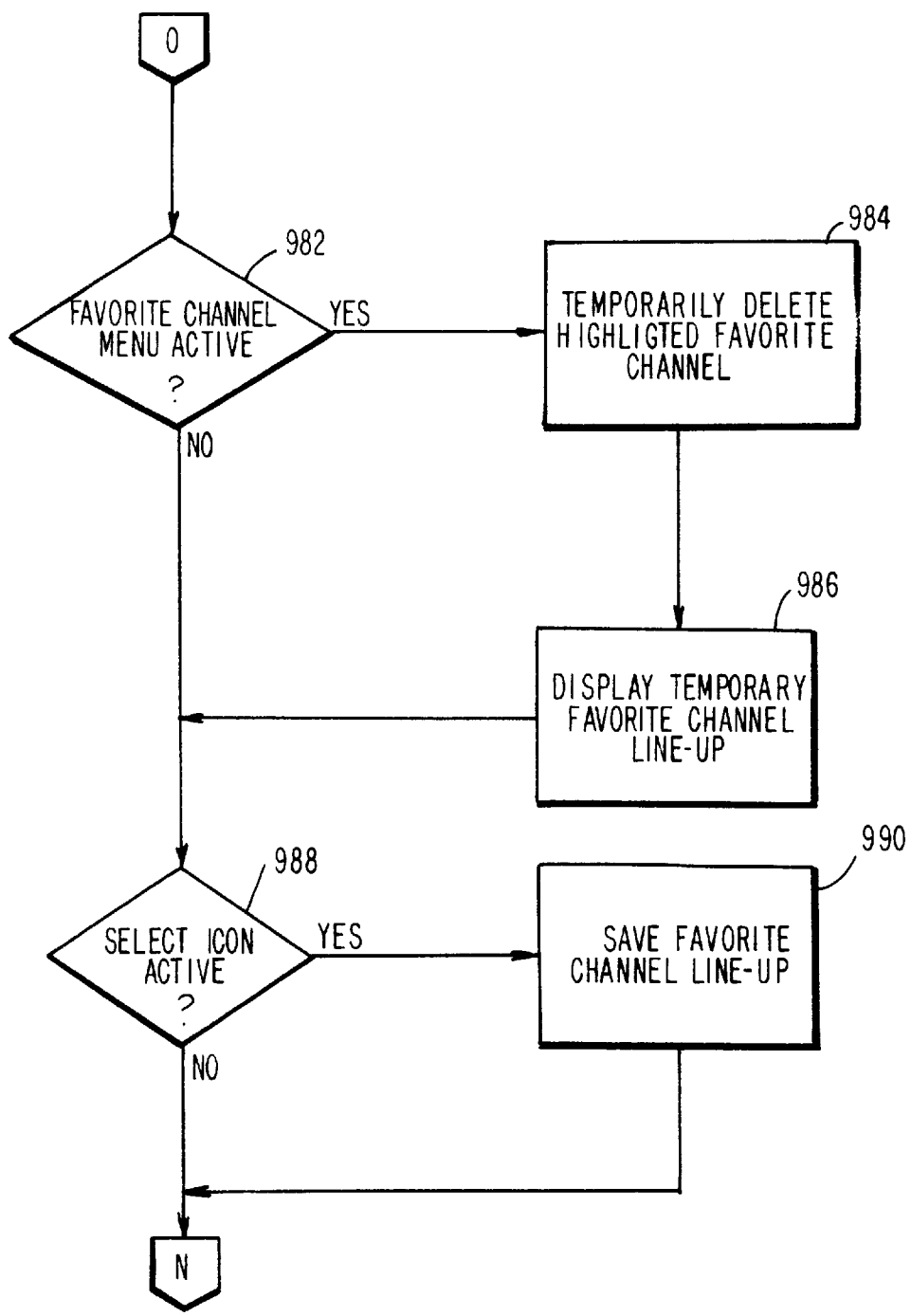

At test 638, the control unit (FIG. 2) determines if the Program Guide routine was invoked from the Day to View display mode (described below in connection with FIGS. 22–23). If it was, at step 660, the control unit 74 (FIG. 2) causes the display 84 (FIG. 2) to display program schedule information in the screen 100 (FIGS. 3–6), starting at the date and day part selected in the Day to View routine (FIGS. 22–23).

Figure 14:
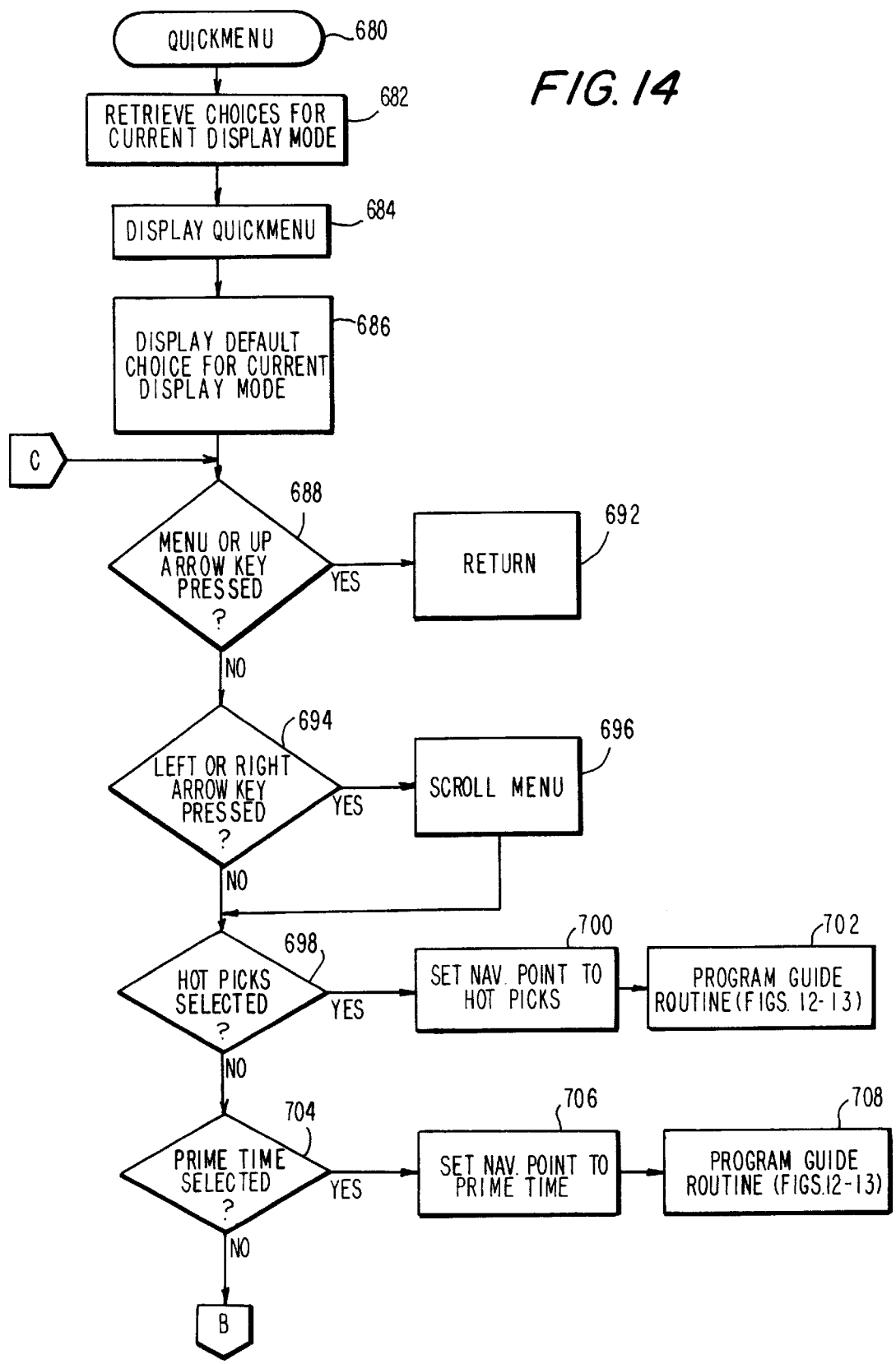
Figure 15:
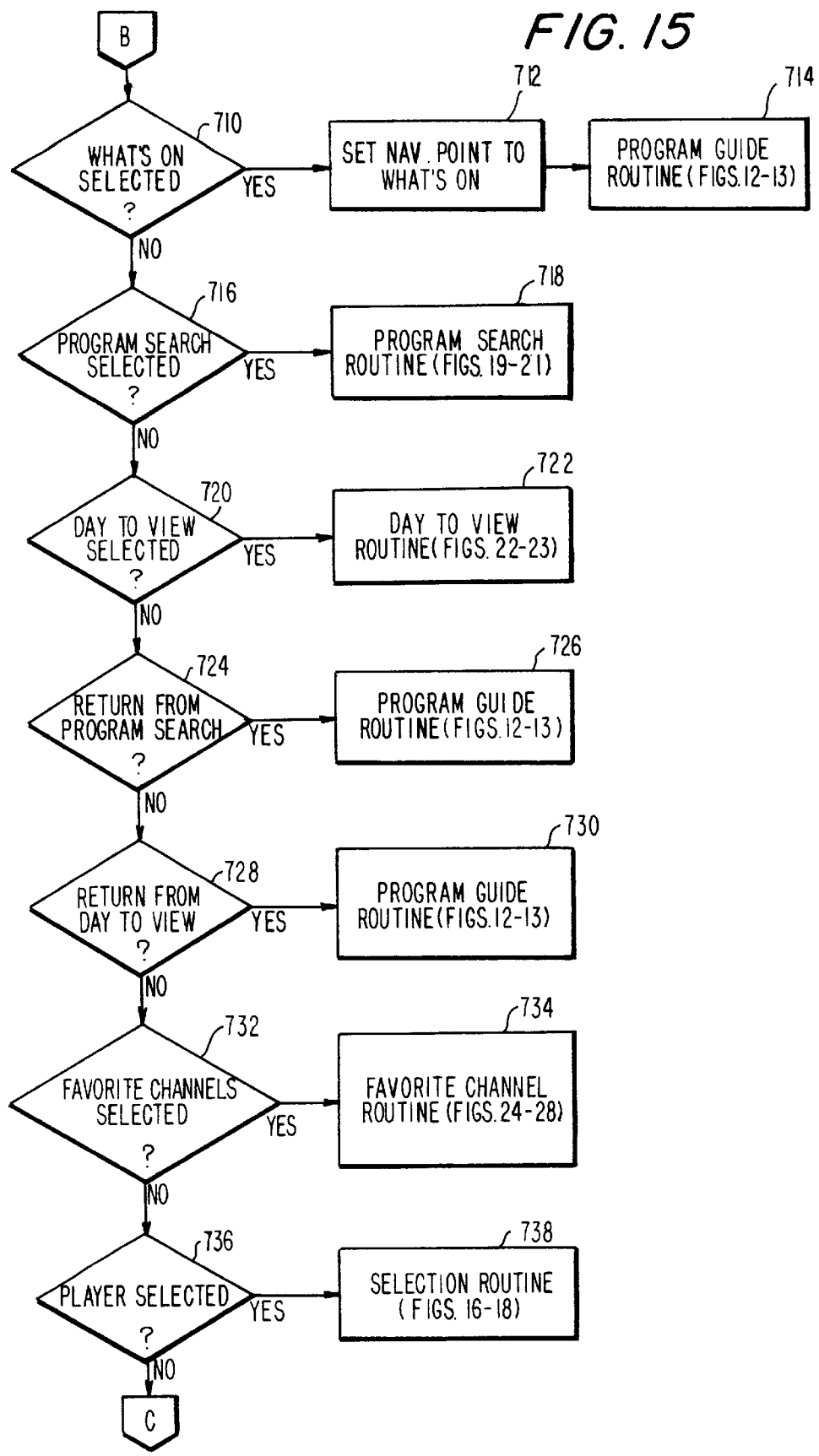

After the control unit 74 (FIG. 2) presents program schedule information in the screen 100 (FIGS. 3–6), test 662 is performed to determine if the Menu key on the remote control 78 (FIG. 2) has been pressed. If the Menu key has been pressed, step 664 is performed to invoke the Quickmenu (FIGS. 14–15). If not, and after the step 664 is performed, the control unit 74 (FIG. 2) proceeds to step 666 to display a cursor in the program grid 112 (FIGS. 3–6). Initially, the cursor is placed on the first program in the program grid 112 (FIGS. 3–6) (i.e., the program displayed in the upper left-most cell in the program grid 112). However, when the cursor is displayed after the viewer returns from the quickmenu (FIGS. 14–15), the cursor is placed on the cell that was highlighted before the quickmenu was invoked.

After step 666, test 668 is performed to determine if the viewer has pressed a navigation key on the remote control 78 (FIG. 2). If a navigation key was pressed, test 670 is performed to determine if the next program cell to be highlighted is currently displayed in the program grid 112 (FIGS. 3–6). If it is, the cursor is displayed in the appropriate program cell at step 672. If not, at step 674, the control unit 74 (FIG. 2) first causes the display 84 (FIG. 2) to scroll the program grid 112 (FIGS. 3–6) (along with either the channel bar 108 (FIGS. 3–6) or the time bar 102 (FIGS. 3–6)) by an amount sufficient to display the appropriate program cell. Step 672 is then performed to move the cursor to the newly displayed program cell.

If a navigation key was not pressed, or after the cursor has been moved, test 676 is performed to determine if the Select key on the remote control 78 (FIG. 2) was pressed. If the Select key was pressed, the Selection routine (described below in connection with FIGS. 16–18) is invoked at step 678. If not, or upon returning from the Selection routine (FIGS. 16–18), the control unit 74 (FIG. 2) loops back to test 662 to wait for the viewer to press a key.

FIGS. 14 and 15 represent the Quickmenu routine 680. After the Quickmenu 680 is invoked, step 682 is performed, where the control unit 74 (FIG. 2) retrieves from the memory 76 (FIG. 2), the quickmenu choices for the display mode from which the quickmenu was invoked. The control unit 74 (FIG. 2) then causes the display 84 (FIG. 2) to display the quickmenu 116 (FIG. 3) on the lower portion of the screen 100, 200, 300, 400, or 500 at the step 684. At step 686, the control unit 74 (FIG. 2) positions the default quickmenu choice for the current display mode in the current choice cell 118 (FIG. 3).

At test 688, the control unit 74 (FIG. 2) checks if the viewer pressed the Menu key or the Up Arrow Key on the remote control 78 (FIG. 2). If one of those keys was pressed at step 692, the quickmenu 116 (FIG. 3) is cleared and control then returns to the routine from which the Quickmenu routine 680 was invoked.

At test 694, the control unit 74 (FIG. 2) checks if the viewer pressed the Left or Right Arrow key on the remote control 78 (FIG. 2). If one of those keys was pressed, the quickmenu 116 (FIG. 3) is scrolled in the appropriate direction at step 696.

After test 694 or step 696, the control unit 74 (FIG. 2) performs a series of tests to determine the viewer's quickmenu choice. At test 698, the control unit 74 (FIG. 2) determines if the viewer selected the "Hot Picks" navigation point. If so, step 700 is performed to set the navigation point to "Hot Picks." The quickmenu 116 (FIG. 3) is then cleared and control is passed to the Program Guide routine (FIGS. 12–13) at step 702.

At test 704, the control unit 74 (FIG. 2) determines if the viewer selected the "Prime Time" navigation point. If so, step 706 is performed to set the navigation point to "Prime Time." The quickmenu 116 (FIG. 3) is then cleared and control is passed to the Program Guide routine (FIGS. 12–13) at step 708.

At test 710, the control unit 74 (FIG. 2) determines if the viewer selected the "What's On" navigation point. If so, step 712 is performed to set the navigation point to "What's On." The quickmenu 116 (FIG. 3) is then cleared and control is passed to the Program Guide routine (FIGS. 12–13) at step 714.

At test 716, the control unit 74 (FIG. 2) determines if the view selected the Program Search display mode. If so, the quickmenu is then cleared and control is passed to a Program Search routine (described below in connection with FIGS. 19–21) at step 718.

At test 720, the control unit 74 (FIG. 2) determines if the viewer selected the Day to View display mode. If so, the quickmenu 116 (FIG. 3) is then cleared and control is passed to a Day to View routine (described below in connection with FIGS. 22–23) at step 722.

At test 724, the control unit 74 (FIG. 2) determines if the viewer selected the "Return" quickmenu choice from the Program Search display mode. If so, the quickmenu 116 (FIG. 3) is then cleared and control is passed to the Program Guide routine (FIGS. 12–13) at step 726.

At test 728, the control unit 74 (FIG. 2) determines if the viewer selected the "Return" quickmenu choice from the Day to View display mode. If so, the quickmenu 116 (FIG. 3) is then cleared and control is passed to the Program Guide routine (FIGS. 12–13) at step 730.

At test 732, the control unit 74 (FIG. 2) determines if the viewer selected the Favorite Channel display mode. If so, the quickmenu 116 (FIG. 3) is then cleared and control is passed to the Favorite Channel routine (described below in connection with FIGS. 24–28) at step 734.

At test 736, the control unit 74 (FIG. 2) determines if the viewer selected the "Player" quickmenu choice. If so, the quickmenu 116 (FIG. 3) is cleared and control is passed to the selection routine (FIGS. 16–18) at step 738.

As shown in FIG. 14, the control unit 74 (FIG. 2) loops back to test 688 after test 736. The loop is maintained until the viewer selects a menu choice from the quickmenu 116 (FIG. 3) or until the viewer presses the Menu or Up Arrow key.

Figure 16:
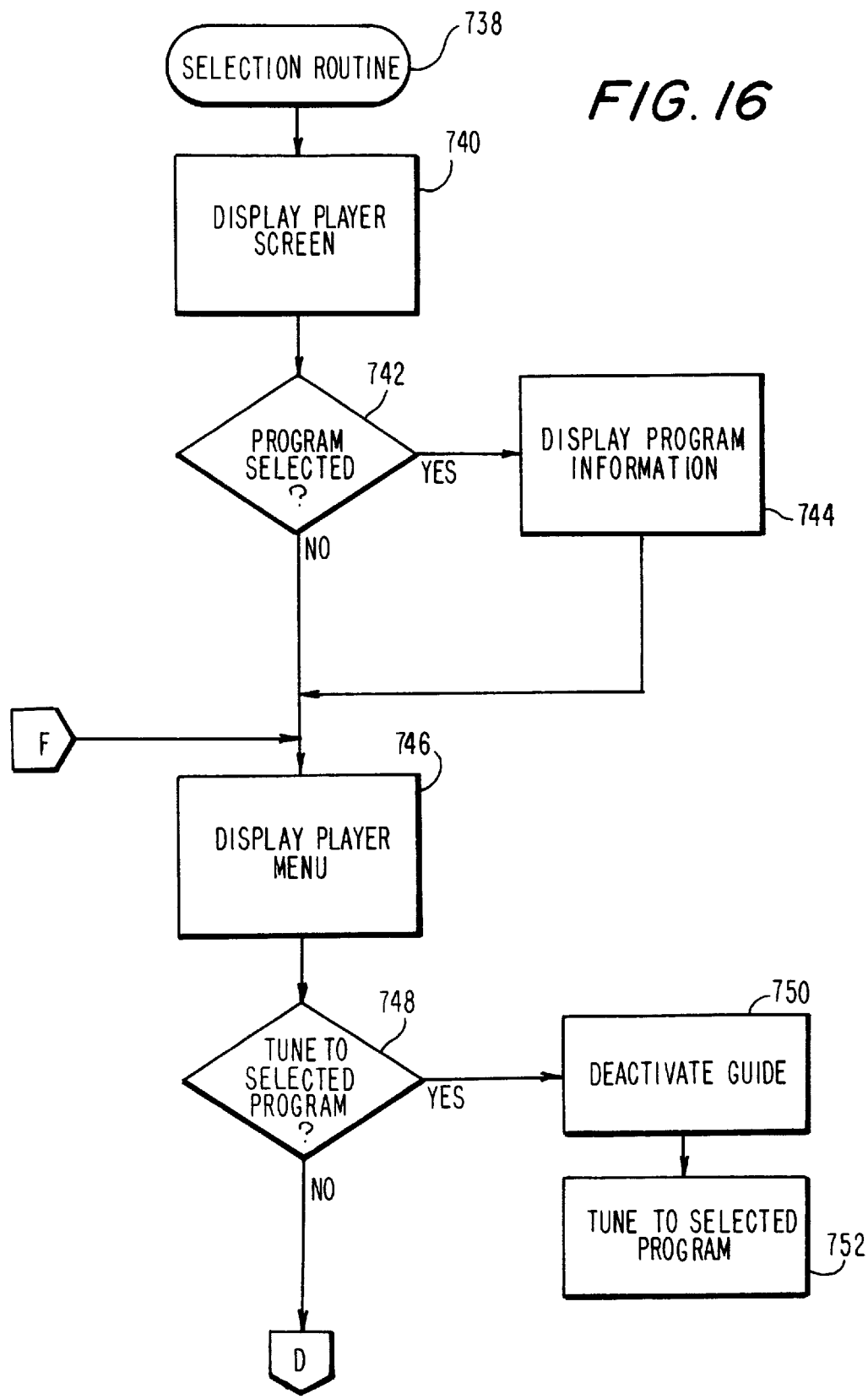
Figure 17:
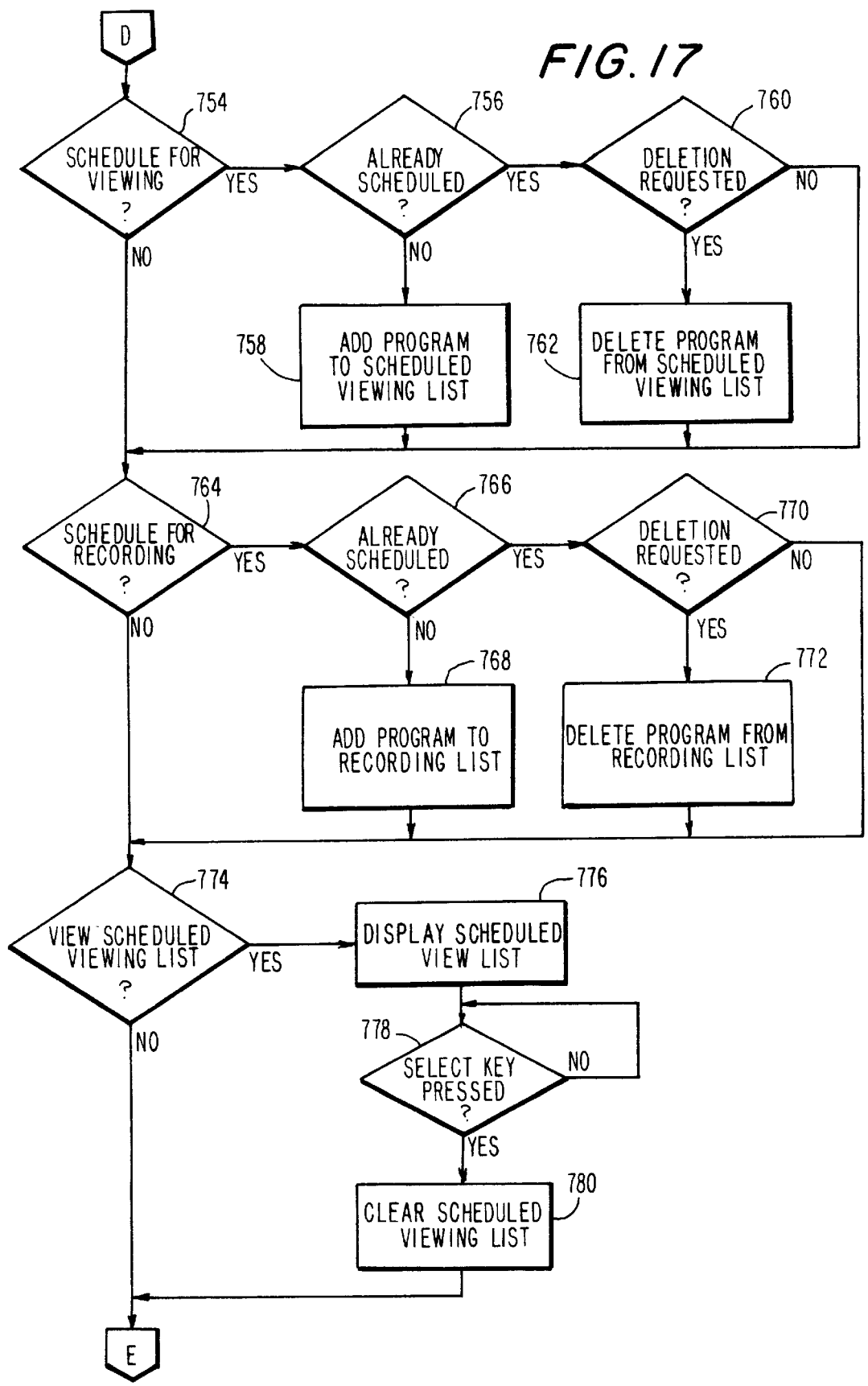
Figure 18:
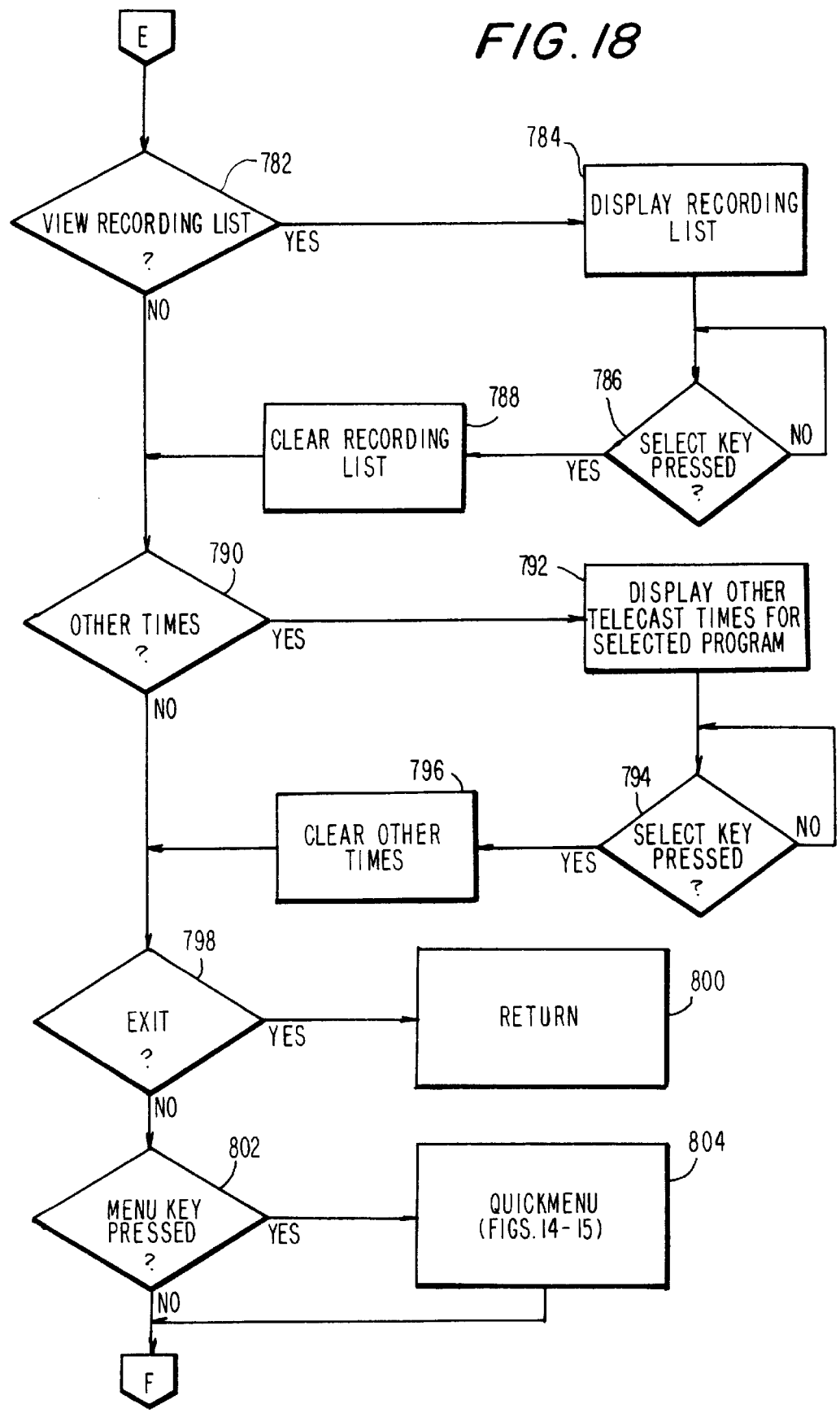

FIGS. 16–18 represent the Selection routine 738. After the Selection routine 738 is invoked, the control unit 74 (FIG. 3) displays the player screen 500 (FIG. 10) at step 740. At test 742, the control unit 74 (FIG. 3) determines if the viewer invoked the player screen 500 (FIG. 10) by selecting a program from either the Program Guide display mode (FIGS. 3–6) or the Program Search display mode (FIG. 7). If the viewer selected a program, at step 744, the title of the selected program is displayed in the title window 502, and additional information about the selected program is displayed in the description window 504 (FIG. 10).

At step 746, the control unit 74 (FIG. 2) displays the player menu in the menu window 508 (FIG. 10). As explained above in connection with FIG. 10, the choices available in the menu window 508 depend upon the circumstances under which the player screen 500 was invoked. The control unit 74 (FIG. 2) then performs a series of tests to determine the viewer's player menu choice.

At test 748, the control unit 74 (FIG. 2) determines if the viewer selected the "Tune to Program" player menu choice (i.e., if the selected program is currently being telecast). If so, the interactive program guide is deactivated (i.e., cleared from the display 84 (FIG. 2)) at step 750. The control unit 74 (FIG. 2) then causes the tuning circuitry 72 (FIG. 2) to tune to the channel that is carrying the selected program at step 752. The program is then displayed on the display 84 (FIG. 2).

At test 754, the control unit 74 (FIG. 2) determines if the viewer selected the "Add to Scheduled Viewing List" player menu choice (i.e., if the selected program is not currently being telecast). If so, test 756 is performed to determine if the viewer already scheduled the selected program for later viewing. If the selected program was not previously scheduled, an entry for the selected program is added to the scheduled viewing list in the memory 76 (FIG. 2) at step 758. If the program was previously scheduled, test 760 is performed to determine if the viewer confirmed the deletion of the previously scheduled program from the scheduled viewing list. This may be accomplished, for example, by displaying a prompt on the display 84 (FIG. 2) requesting that the viewer press the Select key to confirm deletion or a navigation key to cancel the deletion. If the deletion is confirmed, the control unit 74 (FIG. 2) deletes the entry for the selected program from the scheduled viewing list at step 762.

At test 764, the control unit 74 (FIG. 2) determines if the viewer selected the "Add to Recording List" player menu choice (i.e., if the selected program is not currently being telecast). If so, test 766 is performed to determine if the viewer already scheduled the selected program for recording. If the selected program was not previously scheduled, an entry for the selected program is added to the recording list in the memory 76 (FIG. 2) at step 768. If the program was previously scheduled, test 770 is performed to determine if the viewer confirmed the deletion of the previously scheduled program from the scheduled viewing list. This may be accomplished in the manner described above for the test 760. If the deletion is confirmed, the control unit 74 (FIG. 2) deletes the entry for the selected program from the recording list at step 772.

At test 774, the control unit 74 (FIG. 2) determines if the viewer selected the "View Scheduled Viewing List" player menu choice. If so, the scheduled viewing list stored in the memory 76 (FIG. 2) is displayed on the display 84 (FIG. 2) at step 776. At test 778, the control unit 74 (FIG. 2) waits for the viewer to press the Select key on the remote control 78 (FIG. 2). Once the Select key is pressed, the scheduled viewing list is removed from the display 84 (FIG. 2) at step 780.

At test 782, the control unit 74 (FIG. 2) determines if the viewer selected the "View Recording List" player menu choice. If so, the recording list stored in the memory 76 (FIG. 2) is displayed on the display 84 (FIG. 2) at step 784. At test 786, the control unit 74 (FIG. 2) waits for the viewer to press the Select key on the remote control 78 (FIG. 2). Once the Select key is pressed, the recording list is removed from the display 84 (FIG. 2) at step 788.

At test 790, the control unit 74 (FIG. 2) determines if the viewer selected the "Other Times" player menu choice. If so, at step 792, the control unit 74 (FIG. 2) searches the program schedule information stored in the memory 76 (FIG. 2) to determine if the selected program is scheduled for telecast at times other than the selected time. The list of alternative viewing times is displayed on the display 84 (FIG. 2). At test 794, the control unit 74 (FIG. 2) waits for the viewer to press the Select key on the remote control 78 (FIG. 2). Once the Select key is pressed, the list of alternative viewing times is removed from the display 84 (FIG. 2) at step 796.

At test 798, the control unit 74 (FIG. 2) determines if the viewer selected the "Exit" player menu choice. If so, the control is returned to the routine from which the Selection routine 738 was invoked at step 800.

At test 802, the control unit 74 (FIG. 2) determines if the viewer pressed the Menu key on the remote control 78 (FIG. 2). If so, the Quickmenu routine (FIGS. 14–15) is invoked at step 804. After test 802, the control unit 74 (FIG. 2) loops back to step 746 to wait for the viewer's selection.

FIGS. 19–21 represent the Program Search routine 806. After the Program Search routine 806 is invoked, the control unit 74 (FIG. 2) retrieves the selection criteria from the memory 76 (FIG. 2) at step 808. At step 810, the control unit 74 (FIG. 2) sets the active selection criterion to the default selection criterion indicated by the operational parameters stored in the memory 76 (FIG. 2). At step 812, a subset of the selection criteria are displayed in the select menu 202 (FIG. 7), with the default selection criterion appearing in the active selection criterion cell 208 (FIG. 7). At step 814, the select menu 202 (FIG. 7) is designated the active menu.

At step 816, the sort attributes associated with the active selection criterion are retrieved from the memory 76 (FIG. 2). At step 818, the control unit 74 (FIG. 2) sets the active sort attribute to the default attribute indicated by the operational parameters stored in the memory 76 (FIG. 2) for the active selection criterion. At step 820, a subset of the sort attributes are displayed in the sort menu 204 (FIG. 7), with the default sort attribute appearing in the active sort attribute cell 214 (FIG. 7).

At step 822, the control unit 74 (FIG. 2) retrieves from the memory 76 (FIG. 2) program schedule information for programs meeting the active selection criterion. The retrieved programs are sorted in accordance with the active sort attribute at step 824. At step 826, the selected programs are displayed in the appropriate order in the program menu 206 (FIG. 7) on the display 84 (FIG. 2). The control unit 74 (FIG. 2) also causes the display 84 (FIG. 2) to display the total number of programs found and the group headers in the program menu 206 (FIG. 7).

At test 828, the control unit 74 (FIG. 2) checks if the viewer pressed the Left or Right Arrow key on the remote control 78 (FIG. 2). If not, the control unit 74 (FIG. 2) proceeds to step 832. Otherwise, the control unit 74 (FIG. 2) first sets the active menu to the menu chosen by the viewer (either the select menu 202 (FIG. 7), the sort menu 204 (FIG. 7), or the program menu 206 (FIG. 7)) at step 830 before proceeding to step 832. At step 832, the control unit 74 (FIG. 2) causes the display 84 (FIG. 2) to display a cursor in the active menu.

At test 834, the control unit 74 (FIG. 2) checks if the viewer pressed the Up or Down Arrow key on the remote control 78 (FIG. 2). If not, the control unit 74 (FIG. 2) proceeds to step 836. However, if one of these keys was pressed, the result depends on which menu is currently active. If the control unit 74 (FIG. 2) determines at test 838 that the select menu 202 (FIG. 7) is active, steps 840 and 842 are performed to scroll the select menu 202 (FIG. 7) in the appropriate direction, and to set the active selection criterion to the selection criterion displayed in the active selection criterion cell 208 (FIG. 7) after scrolling. If the control unit 74 (FIG. 2) determines at test 844 that the sort menu 204 (FIG. 7) is active, steps 846 and 848 are performed to scroll the sort menu 204 (FIG. 7) in the appropriate direction, and to set the active sort attribute to the sort attribute displayed in the active sort attribute cell 214 (FIG. 7) after scrolling.

If the control unit 74 (FIG. 2) determines at test 850 that the program menu 206 (FIG. 2) is active, test 852 is performed to determine if the next program in the direction indicated by the key pressed by the viewer is currently displayed in the program menu 206 (FIG. 7). If it is, the cursor is moved to the next program at step 854. Otherwise, the program menu 206 (FIG. 7) is first scrolled at step 856 before step 854 is performed.

At step 836, the control unit 74 (FIG. 2) sets a pointer to the program that was most recently highlighted in the program menu 206 (FIG. 7). At test 858, the control unit 74 (FIG. 2) checks if the viewer pressed Select key on the remote control 78 (FIG. 2). If not, the control unit 74 (FIG. 2) proceeds to test 860. Otherwise, test 862 is performed to determine if the program menu 206 (FIG. 2) is the active menu. If it is not, the control unit 74 (FIG. 2) proceeds to test 860. Otherwise, control is passed to the Selection routine (FIGS. 16–18) at step 864.

At test 860, the control unit 74 (FIG. 2) checks if the viewer pressed the Menu key on the remote control 78 (FIG. 2). If not, the control unit 74 (FIG. 2) loops back to step 816. Otherwise, control passes to the Quickmenu routine (FIGS. 14–15) at step 866 before the control unit 74 (FIG. 2) loops back to step 816.

FIGS. 22 and 23 represent the Day to View routine 866. At step 868, control unit 74 (FIG. 2) causes the display 84 (FIG. 2) to display the calendar menu 302 (FIG. 8) for the current month on the screen 300 (FIG. 8). At step 870, the calendar cells corresponding to dates for which program schedule information is available in the memory 76 (FIG. 2) are highlighted. At step 872, the control unit 74 (FIG. 2) causes the display 84 (FIG. 2) to display the day part menu 304. At step 874, the calendar cursor is placed on the calendar cell corresponding to the current date. At step 876, the day part cursor is placed on the day part cell corresponding to the current day part.

The control unit 74 (FIG. 2) then proceeds to perform a series of tests to determine if the viewer pressed the Right, Left, Down, or Up Arrow Key. If the control unit 74 (FIG. 2) determines at test 878 that the Right Arrow key was pressed, test 880 is performed to determine if the next calendar cell to be highlighted is currently displayed. If it is, the cursor is moved to the next calendar cell at step 882. If not, the control unit 74 (FIG. 2) causes the calendar menu 302 (FIG. 8) to advance to the next month at step 884 before step 882 is performed.

If the control unit 74 (FIG. 2) determines at test 886 that the Left Arrow key was pressed, test 888 is performed to determine if the previous calendar cell is currently displayed. If it is, the cursor is moved to the previous calendar cell at step 890. If not, the control unit 74 (FIG. 2) causes the display 84 (FIG. 2) to display the previous month in the calendar menu 302 (FIG. 8) at step 892 before step 890 is performed.

If the control unit 74 (FIG. 2) determines at test 894 that the viewer pressed the Down Arrow key, the day part cursor is moved to the next day part displayed in the day part menu 304 (FIG. 8) at step 896. If the control unit 74 (FIG. 2) determines at test 898 that the viewer pressed the Up Arrow key, the day part cursor is moved to the previous day part displayed in the day part menu 304 (FIG. 8) at step 900. It should be noted that both the calendar menu 302 (FIG. 8) and the day part menu 304 (FIG. 8) preferably operate in an endless loop fashion. Thus, if the viewer tries to advance the cursor beyond the last choice in either of the menus, the cursor wraps to the first choice. The same principle applies in the reverse direction as well.

At step 902, the control unit 74 (FIG. 2) sets a pointer to the date and day part selected by the viewer (i.e., the highlighted choices). At test 904, the control unit 74 (FIG. 2) checks if the viewer pressed the Select key. If the Select key was pressed, control is passed to the Program Guide routine (FIGS. 12–13) at step 906. If not, at test 908, the control unit 74 (FIG. 2) checks if the viewer pressed the Menu key. If the Menu key was pressed, the Quickmenu routine (FIGS. 14–15) is invoked at step 910. If not, or if the viewer chooses to leave the quickmenu 116 (FIG. 3), the control unit 74 (FIG. 2) loops back to the test 878.

FIGS. 24–28 represent the Favorite Channel routine 912. At step 914, the control unit 74 (FIG. 2) causes the display 84 (FIG. 2) to display the full line-up menu 402 (FIG. 9). At step 916, the menu 402 (FIG. 9) is designated as active. At step 918, the control unit 74 (FIG. 2) retrieves the viewer's favorite channel line-up from the memory 76 (FIG. 2), if one exists. The favorite channel menu 404 (FIG. 9), is displayed on the display 84 (FIG. 9) at step 920. At step 922, the select icon 414 (FIG. 9) is displayed.

At test 924, the control unit 74 (FIG. 2) checks if the viewer pressed the Left or Right Arrow key. If not, the cursor is displayed in the active menu at step 926. Otherwise, the active menu is set to the menu chosen by the viewer (i.e., the full line-up menu 402 (FIG. 9), the favorite channel menu 404 (FIG. 9), or the select icon 414 (FIG. 9)) at step 928 before step 926 is performed.

At test 930, the control unit 74 (FIG. 2) checks if the viewer pressed the Up or Down Arrow key. If not, the control unit 74 (FIG. 2) proceeds to test 932. Otherwise, tests 934 and 942 are performed. At test 934, the control unit 74 (FIG. 2) determines if the full line-up menu 402 (FIG. 9) is active. If it is, test 936 is performed to determine if the next channel to be highlighted in the full line-up menu 402 (FIG. 9) is currently displayed. If it is, at step 938, the cursor is moved to the next channel in the full line-up menu 402 (FIG. 9) as indicated by key pressed by the viewer. Otherwise, step 940 is first performed to scroll the full line-up menu 402 (FIG. 9).

At test 942, the control unit 74 (FIG. 2) determines if the favorite channel menu 404 (FIG. 9) is active. If it is, test 944 is performed to determine if the next channel to be highlighted in the favorite channel menu 404 (FIG. 9) is currently displayed. If it is, at step 946, the cursor is moved to the next channel in the favorite channel menu 404 (FIG. 9) as indicated by the key pressed by the viewer. Otherwise, step 948 is first performed to scroll the favorite channel menu 404 (FIG. 9).

At test 932, the control unit 74 (FIG. 2) checks if the viewer pressed the Select key. If not, the control unit 74 (FIG. 2) then checks if the viewer pressed the Menu key at test 950. If not, the control unit 74 (FIG. 2) loops back to test 924. If the Menu key was pressed, the Quickmenu routine (FIGS. 14–15) is invoked at step 952. If the viewer then leaves the quickmenu 116 (FIG. 3) without making a selection, the control unit 74 (FIG. 2) then loops back to the step 924.

If the control unit 74 (FIG. 2) determines that the viewer pressed the Select key at test 932, test 954 is performed to determine if the full line-up menu 402 (FIG. 9) is active. If it is, the control unit 74 (FIG. 2) sets a pointer to the highlighted channel at step 956. Test 958 is then performed to determine if the first opening in the favorite channel menu 404 (FIG. 9) is currently displayed. If it is, at step 960, the cursor is moved to the first open cell in the favorite channel menu 404 (FIG. 9). Otherwise, step 962 is first performed to scroll the favorite channel menu 404 (FIG. 9) by an amount sufficient to display the first open cell. At step 964, the channel referenced by the pointer set at step 956 is displayed in the highlighted cell of the favorite channel menu 404 (FIG. 9).

At test 966, the control unit 74 (FIG. 2) again checks if the viewer pressed the Select key. If not, test 968 is performed to check if the viewer pressed the Up or Down Arrow key. If not, the control unit 74 (FIG. 2) loops back to the test 966 to wait for the viewer to press either the Select, Up Arrow, or Down Arrow key. If the viewer pressed the Up or Down Arrow key, test 970 is performed to determine if the next opening in the favorite channel menu 404 (FIG. 9) is currently displayed. If it is, at step 972, the cursor is moved to the next opening in the favorite channel menu 404 (FIG. 9) as indicated by the key pressed by the viewer. Otherwise, step 974 is first performed to scroll the favorite channel menu 404 (FIG. 9) by an amount sufficient to display the next opening. After step 972, the control unit 74 (FIG. 2) loops back to step 964.

If the control unit 74 (FIG. 2) determines at test 966 that the viewer pressed the Select key, the channel highlighted in the favorite channel menu 404 (FIG. 9) is temporarily inserted into the viewer's favorite channel line-up at step 976. At step 978, the previous contents of the favorite channel menu 404 (FIG. 9) is replaced with the new temporary favorite channel line-up. At step 980, the cursor is returned to the full line-up menu 402 (FIG. 9). The control unit 74 (FIG. 2) then loops back to test 924.

If the control unit 74 (FIG. 2) determines at test 954 that the full line-up menu 402 (FIG. 9) is not active, test 982 is performed to determine if the favorite channel menu 404 (FIG. 9) is active. If it is, the channel highlighted in the favorite channel menu 404 (FIG. 9) is temporarily deleted from the viewer's favorite channel line-up at step 984. At step 986, the contents of the favorite channel menu 404 (FIG. 9) is replaced with the new temporary favorite channel line-up, with an opening being left in the cell previously occupied by the recently deleted favorite channel.

If the control unit 74 (FIG. 2) determines at test 982 that the favorite channel menu 404 (FIG. 9) is not active, test 988 is performed to determine if the select icon 414 (FIG. 9) is active. If it is, the temporary favorite channel line-up is stored for future use in the memory 76 (FIG. 2) at step 990. Otherwise, the control unit 74 (FIG. 2) loops back to test 924.

Thus it is seen that interactive television program guide systems and related processes are provided that include an intuitive search utility for allowing a viewer to locate programs of interest by applying a restrictive search selection criterion and a nonrestrictive sort attribute to program schedule information. One skilled in the art will appreciate that the present invention can be practiced by other than the described embodiments, which are presented for purposes of illustration and not of limitation, and the present invention is limited only by the claims which follow.

What is claimed is:

1. An interactive program guide system for displaying program schedule information on a display, the system comprising:

a user input device for choosing a restrictive program selection criterion and a nonrestrictive program sort attribute; and a control unit for (a) performing a restrictive search operation on said program schedule information based on said restrictive program selection criterion chosen using said user input device, wherein said restrictive search operation produces a resulting list of said program schedule information that is arranged in a default sequence, and (b) performing a nonrestrictive sort operation on said resulting list of said program schedule information based on said nonrestrictive program sort attribute chosen using said user input device, wherein said nonrestrictive sort operation rearranges said resulting list of said program schedule information from said default sequence to a sequence indicated by said nonrestrictive program sort attribute without eliminating any of said program schedule information in said resulting list of said program schedule information.

2. The interactive program guide system of claim 1, wherein:

said user input device is further used to choose a portion of said resulting list as a chosen portion of said resulting list; and said control unit further generates, for display on said display, a program guide list that is indexed to said chosen portion of said resulting list and that comprises at least a portion of said program schedule information.

3. The interactive program guide system of claim 2, wherein said program guide list is arranged in a grid format with rows corresponding to telecast channel numbers and columns corresponding to telecast times.

4. The interactive program guide system of claim 1, wherein said resulting list includes a header that indicates how many programs correspond to said resulting list.

5. The interactive program guide system of claim 1, wherein said resulting list indicates at least one of a title, a channel number, a call sign, a date, a time, and a rating for each program corresponding to said resulting list.

6. The interactive program guide system of claim 1, wherein said resulting list comprises at least one group of programs that are positioned together in said resulting list and that each have a common characteristic.

7. The interactive program guide system of claim 6, wherein each of said at least one group comprises a group header that indicates said common characteristic.

8. The interactive program guide system of claim 1, wherein said user input device is further used to choose a portion of said resulting list corresponding to at least one program and to indicate that said at least one program is to be added to a scheduled viewing list.

9. The interactive program guide system of claim 1, wherein said user input device is further used to choose a portion of said resulting list corresponding to at least one program and to indicate that said at least one program is to be added to a recording list.

10. The interactive program guide system of claim 1, wherein said user input device is further used to choose a portion of said resulting list corresponding to at least one program and to indicate a request to purchase said at least one program.

11. The interactive program guide system of claim 1, wherein:

said user input device is further used to choose a portion of said resulting list corresponding to at least one program and to indicate a desire to view other telecast times for said at least one program; and said control unit further generates, for display on said display, an other telecast list that indicates said other telecast times for said at least one program.

12. The interactive program guide system of claim 1, wherein the system further includes a tuner, and wherein:

said user input device is further used to choose a portion of said resulting list corresponding to a program and to select said program for viewing; and said control unit further causes said tuner to tune to said program and generate a program output for display on said display.

13. The interactive program guide system of claim 1, wherein said control unit causes said display to display restrictive program selection criteria and nonrestrictive program sort attributes and said user input device is used to select one of said restrictive program selection criteria as said restrictive program selection criterion and one of said nonrestrictive program sort attributes as said nonrestrictive sort attribute.

14. The interactive program guide system of claim 13, wherein said restrictive program selection criteria are displayed in the form of a scrollable list and wherein said user input device is used to select one of said restrictive program selection criteria as said restrictive program selection criterion by positioning a cursor on said one of said restrictive program selection criteria.

15. The interactive program guide system of claim 13, wherein said restrictive program selection criteria are displayed in the form of a scrollable list and wherein said user input device is used to select one of said restrictive program selection criteria as said restrictive program selection criterion by positioning a cursor on said one of said restrictive program selection criteria and pressing a select key.

16. The interactive program guide system of claim 13, wherein said nonrestrictive program sort attributes are displayed in the form of a scrollable list and wherein said user input device is used to select one of said nonrestrictive program sort attributes as said nonrestrictive program sort attribute by positioning a cursor on said one of said nonrestrictive program sort attributes.

17. The interactive program guide system of claim 13, wherein said nonrestrictive program sort attributes are displayed in the form of a scrollable list and wherein said user input device is used to select one of said nonrestrictive program sort attributes as said nonrestrictive program sort attribute by positioning a cursor on said one of said nonrestrictive program sort attributes and pressing a select key.

18. The interactive program guide system of claim 13, wherein at least a portion of said restrictive program selection criteria and at least a portion of said nonrestrictive program sort attributes are displayed on said display simultaneously.

19. The interactive program guide system of claim 13, wherein at least a portion of said restrictive program selection criteria and at least a portion of said resulting list are displayed on said display simultaneously.

20. The interactive program guide system of claim 13, wherein at least a portion of said nonrestrictive program sort attributes and at least a portion of said resulting list are displayed on said display simultaneously.

21. The interactive program guide system of claim 13, wherein at least a portion of said restrictive program selection criteria, at least a portion of said nonrestrictive program sort attributes, and at least a portion of said resulting list are displayed on said display simultaneously.

22. The interactive program guide system of claim 13, wherein said nonrestrictive program sort attributes that are displayed are chosen for display as a result of said restrictive program selection criterion, and said nonrestrictive program sort attributes chosen for display differ for at least two of said restrictive program selection criteria.

23. The interactive program guide system of claim 13, wherein said control unit receives definitions of said restrictive program selection criteria through a transmission from a service provider.

24. The interactive program guide system of claim 23, wherein said definitions of said restrictive program selection criteria include at least one of a drama selection criterion, an action selection criterion, a science fiction selection criterion, a movies selection criterion, a comedy selection criterion, a sports selection criterion, a TV selection criterion, a documentaries selection criterion, a Pay-Per-View selection criterion, and an On-In-Next-Hour selection criterion.

25. The interactive program guide system of claim 13, wherein said control unit receives definitions of said nonrestrictive program sort attributes through a transmission from a service provider.

26. The interactive program guide system of claim 25, wherein said definitions of said nonrestrictive program sort attributes include at least one of an alphabetize sort attribute, a rating sort attribute, a telecast time sort attribute, a sport sort attribute, and a channel order sort attribute.

27. The interactive program guide system of claim 13, wherein said control unit receives a definition of a default restrictive program selection criterion from said restrictive program selection criteria through a transmission from a service provider.

28. The interactive program guide system of claim 13, wherein said control unit receives a definition of a default nonrestrictive program sort attribute from said nonrestrictive program sort attributes through a transmission from a service provider.

29. The interactive program guide system of claim 13, wherein said control unit receives a definition of an order in which said restrictive program selection criteria are displayed on said display through a transmission from a service provider.

30. The interactive program guide system of claim 13, wherein said control unit receives a definition of an order in which said nonrestrictive program sort attributes are displayed on said display through a transmission from a service provider.

31. A method for displaying program schedule information on a display, the method comprising:

performing a restrictive search operation on said program schedule information based on a restrictive program selection criterion chosen using a user input device, wherein said restrictive search operation produces a resulting list of said program schedule information that is arranged in a default sequence; and performing a nonrestrictive sort operation on said resulting list of said program schedule information based on a nonrestrictive program sort attribute chosen using said user input device, wherein said nonrestrictive sort operation rearranges said resulting list of said program schedule information from said default sequence to a sequence indicated by said nonrestrictive program sort attribute without eliminating any of said program schedule information in said resulting list of said program schedule information.

32. The method of claim 31 further comprising:

choosing a portion of said resulting list as a chosen portion of said resulting list; and generating, for display on said display, a program guide list that is indexed to said chosen portion of said resulting list and that comprises at least a portion of said program schedule information.

33. The method of claim 32, wherein said program guide list is arranged in a grid format with rows corresponding to telecast channel numbers and columns corresponding to telecast times.

34. The method of claim 31, wherein said resulting list includes a header that indicates how many programs correspond to said resulting list.

35. The method of claim 31, wherein said resulting list indicates at least one of a title, a channel number, a call sign, a date, a time, and a rating for each program corresponding to said resulting list.

36. The method of claim 31, wherein said resulting list comprises at least one group of programs that are positioned together in said resulting list and each have a common characteristic.

37. The method of claim 36, wherein each of said at least one group comprises a group header that indicates said common characteristic.

38. The method of claim 31 further comprising:

choosing a portion of said resulting list corresponding to at least one program; and indicating that said at least one program is to be added to a scheduled viewing list.

39. The method of claim 31 further comprising:

choosing a portion of said resulting list corresponding to at least one program; and indicating that said at least one program is to be added to a recording list.

40. The method of claim 31 further comprising:

choosing a portion of said resulting list corresponding to at least one program; and indicating a request to purchase said at least one program.

41. The method of claim 31 further comprising:

choosing a portion of said resulting list corresponding to at least one program;

indicating a desire to view other telecast times for said at least one program; and generating, for display on said display, an other telecast list that indicates said other telecast times for said at least one program.

42. The method of claim 31 further comprising:

choosing a portion of said resulting list corresponding to a program;

selecting said program for viewing;

tuning to said program; and generating a program output for display on said display.

43. The method of claim 31 further comprising:

causing said display to display restrictive program selection criteria and nonrestrictive program sort attributes; and selecting, using said user input device, one of said restrictive program selection criteria as said restrictive program selection criterion and one of said nonrestrictive program sort attributes as said nonrestrictive program sort attribute.

44. The method of claim 43, wherein said restrictive program selection criteria are displayed in the form of a scrollable list and wherein said selecting of said one of said restrictive program selection criteria as said restrictive program selection criterion is achieved by positioning a cursor on said one of said restrictive program selection criteria.

45. The method of claim 43, wherein said restrictive program selection criteria are displayed in the form of a scrollable list and wherein said selecting of said one of said restrictive program selection criteria as said restrictive program selection criterion is achieved by positioning a cursor on said one of said restrictive program selection criteria and pressing a select key.

46. The method of claim 43, wherein said nonrestrictive program sort attributes are displayed in the form of a scrollable list and wherein said selecting of said one of said nonrestrictive program sort attributes as said nonrestrictive program sort attribute is achieved by positioning a cursor on said one of said nonrestrictive program sort attributes.

47. The method of claim 43, wherein said nonrestrictive program sort attributes are displayed in the form of a scrollable list and wherein said selecting of said one of said nonrestrictive program sort attributes as said nonrestrictive program sort attribute is achieved by positioning a cursor on said one of said nonrestrictive program sort attributes and pressing a select key.

48. The method of claim 43, wherein at least a portion of said restrictive program selection criteria and at least a portion of said nonrestrictive program sort attributes are displayed on said display simultaneously.

49. The method of claim 43, wherein at least a portion of said restrictive program selection criteria and at least a portion of said resulting list are displayed on said display simultaneously.

50. The method of claim 43, wherein at least a portion of said nonrestrictive program sort attributes and at least a portion of said resulting list are displayed on said display simultaneously.

51. The method of claim 43, wherein at least a portion of said restrictive program selection criteria, at least a portion of said nonrestrictive program sort attributes, and at least a portion of said resulting list are displayed on said display simultaneously.

52. The method of claim 43 wherein said nonrestrictive program sort attributes that are displayed are chosen for display as a result of said restrictive program selection criterion, and said nonrestrictive program sort attributes chosen for display differ for at least two of said restrictive program selection criteria.

53. The method of claim 43 further comprising:

receiving definitions of said restrictive program selection criteria through a transmission from a service provider.

54. The method of claim 53, wherein said definitions of said restrictive program selection criteria include at least one of a drama selection criterion, an action selection criterion, a science fiction selection criterion, a movies selection criterion, a comedy selection criterion, a sports selection criterion, a TV selection criterion, a documentaries selection criterion, a Pay-Per-View selection criterion, and a On-In-Next-Hour selection criterion.

55. The method of claim 43 further comprising:

receiving definitions of said nonrestrictive program sort attributes through a transmission from a service provider.

56. The method of claim 55, wherein said definitions of said nonrestrictive program sort attributes include at least one of an alphabetize sort attribute, a rating sort attribute, a telecast time sort attribute, a sport sort attribute, and a channel order sort attribute.

57. The method of claim 43 further comprising:

receiving a definition of a default restrictive program selection criterion from said restrictive program selection criteria through a transmission from a service provider.

58. The method of claim 43 further comprising:

receiving a definition of a default nonrestrictive program sort attribute from said nonrestrictive program sort attributes through a transmission from a service provider.

59. The method of claim 43 further comprising:

receiving a definition of an order in which said restrictive program selection criteria are displayed on said display through a transmission from a service provider.

60. The method of claim 43 further comprising:

receiving a definition of an order in which said nonrestrictive program sort attributes are displayed on said display through a transmission from a service provider.

61. An apparatus for displaying on a display, program schedule information based on a restrictive program selection criterion and a nonrestrictive program sort attribute, the apparatus comprising:

means for performing a restrictive search operation on said program schedule information based on said restrictive program selection criterion, wherein said restrictive search operation produces a resulting list of said program schedule information that is arranged in a default sequence; and means for performing a nonrestrictive sort operation on said resulting list of said program schedule information based on said nonrestrictive program sort attribute, wherein said nonrestrictive sort operation rearranges said resulting list of said program schedule information from said default sequence to a sequence indicated by said nonrestrictive program sort attribute without eliminating any of said program schedule information in said resulting list of said program schedule information.

62. The apparatus of claim 61, wherein said resulting list includes a header that indicates how many programs correspond to said resulting list.

63. The apparatus of claim 61, wherein said resulting list indicates at least one of a title, a channel number, a call sign, a date, a time, and a rating for each program corresponding to said resulting list.

64. The apparatus of claim 61, wherein said resulting list comprises at least one group of programs that are positioned together in said resulting list and that each have a common characteristic.

65. The apparatus of claim 64, wherein each of said at least one group comprises a group header that indicates said common characteristic.

66. The apparatus of claim 61, further comprising:
means for choosing said restrictive program selection criterion and said nonrestrictive program sort attribute.

67. The apparatus of claim 66, wherein:
said means for choosing is further used to choose a portion of said resulting list as a chosen portion of said resulting list; and
said means for generating further generates, for display on said display, a program guide list that is indexed to said chosen portion of said resulting list and that comprises at least a portion of said program schedule information.

68. The apparatus of claim 67, wherein said program guide list is arranged in a grid format with rows corresponding to telecast channel numbers and columns corresponding to telecast times.

69. The apparatus of claim 66, wherein said means for choosing is further used to choose a portion of said resulting list corresponding to at least one program and indicate that said at least one program is to be added to a scheduled viewing list.

70. The apparatus of claim 66, wherein said means for choosing is further used to choose a portion of said resulting list corresponding to at least one program and indicate that said at least one program is to be added to a recording list.

71. The apparatus of claim 66, wherein said means for choosing is further used to choose a portion of said resulting list corresponding to at least one program and indicate a request to purchase said at least one program.

72. The apparatus of claim 66, wherein:
said means for choosing is further used to choose a portion of said resulting list corresponding to at least one program and indicate a desire to view other telecast times for said at least one program; and
said means for generating further generates, for display on said display, an other telecast list that indicates said other telecast times for said at least one program.

73. The apparatus of claim 66, wherein the apparatus further comprises:
means for tuning to a selected program,
wherein:
said means for choosing is further used to choose a portion of said resulting list corresponding to said selected program, and to select said selected program for viewing; and
said means for generating further generates a program output for display on said display.

74. The apparatus of claim 66, wherein:
said means for generating causes said display to display restrictive program selection criteria and nonrestrictive program sort attributes; and
said means for choosing is used to select one of said restrictive program selection criteria as said restrictive program selection criterion and one of said nonrestrictive program sort attributes as said nonrestrictive sort attribute.

75. The apparatus of claim 74, wherein said restrictive program selection criteria are displayed in the form of a scrollable list and wherein said means for choosing is used to choose one of said restrictive program selection criteria as said restrictive program selection criterion by positioning a cursor on said one of said restrictive program selection criteria.

76. The apparatus of claim 74, wherein said restrictive program selection criteria are displayed in the form of a scrollable list and wherein said means for choosing is used to choose one of said restrictive program selection criteria as said restrictive program selection criterion by positioning a cursor on said one of said restrictive program selection criteria and depressing a select key.

77. The apparatus of claim 74, wherein said nonrestrictive program sort attributes are displayed in the form of a scrollable list and wherein said means for choosing is used to choose one of said nonrestrictive program sort attributes as said nonrestrictive program sort attribute by positioning a cursor on said one of said nonrestrictive program sort attributes.

78. The apparatus of claim 74, wherein said nonrestrictive program sort attributes are displayed in the form of a scrollable list and wherein said means for choosing is used to choose one of said nonrestrictive program sort attributes as said nonrestrictive program sort attribute by positioning a cursor on said one of said nonrestrictive program sort attributes and depressing a select key.

79. The apparatus of claim 74, wherein at least a portion of said restrictive program selection criteria and at least a portion of said nonrestrictive program sort attributes are displayed on said display simultaneously.

80. The apparatus of claim 74, wherein at least a portion of said restrictive program selection criteria and at least a portion of said resulting list are displayed on said display simultaneously.

81. The apparatus of claim 74, wherein at least a portion of said nonrestrictive program sort attributes and at least a portion of said resulting list are displayed on said display simultaneously.

82. The apparatus of claim 74, wherein at least a portion of said restrictive program selection criteria, at least a portion of said nonrestrictive program sort attributes, and at least a portion of said resulting list are displayed on said display simultaneously.

83. The apparatus of claim 74, wherein said nonrestrictive program sort attributes that are displayed are chosen for display as a result of said restrictive program selection criterion, and said nonrestrictive program sort attributes chosen for display differ for at least two of said restrictive program selection criteria.

84. The apparatus of claim 74, wherein said means for generating receives definitions of said restrictive program selection criteria through a transmission from a service provider.

85. The apparatus of claim 84, wherein said definitions of said restrictive program selection criteria include at least one of a drama selection criterion, an action selection criterion, a science fiction selection criterion, a movies selection criterion, a comedy selection criterion, a sports selection criterion, a TV selection criterion, a documentaries selection criterion, a Pay-Per-View selection criterion, and an On-In-Next-Hour selection criterion.

86. The apparatus of claim 74, wherein said means for generating receives definitions of said nonrestrictive program sort attributes through a transmission from a service provider.

87. The apparatus of claim 86, wherein definitions of said nonrestrictive program sort attribute include at least one of an alphabetize sort attribute, a rating sort attribute, a telecast time sort attribute, sport sort attribute, and a channel order sort attribute.

88. The apparatus of claim 74, wherein said means for generating receives a definition of a default restrictive program selection criterion from said restrictive program selection criteria through a transmission from a service provider.

89. The apparatus of claim 74, wherein said means for generating receives a definition of a default nonrestrictive program sort attribute from said nonrestrictive program sort attributes through a transmission from a service provider.

90. The apparatus of claim 74, wherein said means for generating receives a definition of an order in which said restrictive program selection criteria are displayed on said display through a transmission from a service provider.

91. The apparatus of claim 74, wherein said means for generating receives a definition of an order in which said nonrestrictive program sort attributes are displayed on said display through a transmission from a service provider.

* * * * *